(12) United States Patent
Afman et al.

(10) Patent No.: US 12,174,633 B2
(45) Date of Patent: Dec. 24, 2024

(54) WATERCRAFT AUTO-DOCKING SYSTEM AND WATERCRAFT AUTO-DOCKING METHOD

(71) Applicant: YAMAHA HATSUDOKI KABUSHIKI KAISHA, Shizuoka (JP)

(72) Inventors: Juan Pablo Afman, Kennesaw, GA (US); Thomas Gurriet, Acworth, GA (US)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 53 days.

(21) Appl. No.: 17/899,502

(22) Filed: Aug. 30, 2022

(65) Prior Publication Data

US 2022/0413499 A1    Dec. 29, 2022

Related U.S. Application Data

(63) Continuation of application No. 17/689,635, filed on Mar. 8, 2022, now Pat. No. 12,066,827.

(60) Provisional application No. 63/210,651, filed on Jun. 15, 2021, provisional application No. 63/158,680, filed on Mar. 9, 2021.

(51) Int. Cl.
| | | |
|---|---|---|
| G05D 1/00 | (2024.01) | |
| B63B 49/00 | (2006.01) | |
| B63B 79/40 | (2020.01) | |
| G05D 1/43 | (2024.01) | |
| G05D 1/81 | (2024.01) | |

(52) U.S. Cl.
CPC ........... *G05D 1/0206* (2013.01); *B63B 49/00* (2013.01); *B63B 79/40* (2020.01); *G05D 1/0088* (2013.01); *G05D 1/43* (2024.01); *G05D 1/81* (2024.01)

(58) Field of Classification Search
CPC .... G05D 1/0206; G05D 1/0088; B63B 79/40; B63B 49/00
See application file for complete search history.

(56) References Cited

U.S. PATENT DOCUMENTS

| | | |
|---|---|---|
| 6,677,889 B2 | 1/2004 | Van Rees et al. |
| 7,021,231 B2 | 4/2006 | Smart |
| 7,389,735 B2 | 6/2008 | Kaji et al. |
| 2017/0069211 A1* | 3/2017 | Khurana ............ G01C 21/3685 |
| 2018/0335780 A1 | 11/2018 | Stevens et al. |

(Continued)

*Primary Examiner* — Aaron L Troost
(74) *Attorney, Agent, or Firm* — Global IP Counsels, LLP

(57) ABSTRACT

A watercraft auto-docking system basically includes a user interface and a digital controller. The user interface includes a display monitor. The digital controller includes a processor, a computer memory and an I/O interface. The user interface is connected to the I/O interface. The digital controller is configured to graphically display a map image with at least one selectable dock on the display monitor. The digital controller is further configured to select a target dock for docking a watercraft in an auto-docking mode in response to a user input selecting a selectable dock on the map image using the user interface. The digital controller is configured to generate a docking path from a current location of the watercraft to a target location of the target dock. The digital controller is configured to autonomously navigate the watercraft using an autopilot system along the docking path until the watercraft reaches the target location of the target dock.

14 Claims, 25 Drawing Sheets

(56) References Cited

U.S. PATENT DOCUMENTS

| | | | | |
|---|---|---|---|---|
| 2019/0258258 A1* | 8/2019 | Tyers | ...................... | G01S 19/13 |
| 2019/0310624 A1* | 10/2019 | Bettger | ................ | G05D 1/0088 |
| 2019/0361457 A1* | 11/2019 | Johnson | ............... | G05D 1/0044 |
| 2020/0042004 A1* | 2/2020 | Fujiyama | .............. | G05D 1/0206 |
| 2020/0258385 A1* | 8/2020 | Mahajan | ............... | G01S 17/931 |
| 2022/0028278 A1* | 1/2022 | Hara | ........................ | G08G 3/00 |

* cited by examiner

# WATERCRAFT AUTO-DOCKING SYSTEM AND WATERCRAFT AUTO-DOCKING METHOD

CROSS-REFERENCE TO RELATED APPLICATIONS

This is a continuation application of U.S. patent application Ser. No. 17/689,635 filed on Mar. 8, 2022, which claims the benefit of U.S. Provisional Application Nos. 63/158,680, filed on Mar. 9, 2021 and 63/210,651, filed on Jun. 15, 2021. The entire disclosures of U.S. patent application Ser. No. 17/689,635 and U.S. Provisional Application Nos. 63/158,680 and 63/210,651 are hereby incorporated herein by reference.

BACKGROUND

Technical Field

The present disclosure generally relates to the field of watercrafts. More particularly, the present disclosure relates to an auto-docking system of a watercraft.

Background Information

For most drivers or users of watercrafts, docking is one of the most stressful operations of the watercrafts. For example, when docking a watercraft, a driver or user (hereinafter merely referred to as a "user") of the watercraft needs to navigate the watercraft within a marina along an intended course while avoiding obstructs and considering water depths, wind direction and strength, current, etc.

In recent years, some watercrafts are provided with a docking assist system that helps the user navigate the watercraft to stay on the intended course by compensating for some external forces, such as wind and/or current.

SUMMARY

However, the docking assist system merely assists the user to navigate the watercraft, and still requires the user's manual navigation of the watercraft near a target dock. Also, the docking assist system usually requires sensors that are mounted on the target dock, which can increase the cost of the docking assist system and be problematic when the user wants to dock the watercraft to a dock without the sensors. In order to make docking less stressful and give the user an easier boating experience, it is desirable to have an automated docking or auto-docking system that autonomously navigates the watercraft to a target dock and that is provided with an intuitive human-machine interface (HMI).

In accordance with one aspect of the present disclosure, a watercraft auto-docking system basically includes a user interface and a digital controller. The user interface includes a display monitor. The digital controller includes a processor, a computer memory and an I/O interface. The user interface is connected to the I/O interface. The digital controller is configured to graphically display a map image with at least one selectable dock on the display monitor. The digital controller is further configured to select a target dock for docking a watercraft in an auto-docking mode in response to a user input selecting a selectable dock on the map image using the user interface. The digital controller is configured to generate a docking path from a current location of the watercraft to a target location of the target dock. The digital controller is configured to autonomously navigate the watercraft using an autopilot system along the docking path until the watercraft reaches the target location of the target dock.

In accordance with another aspect of the present disclosure, a watercraft auto-docking method includes graphically displaying a map image with at least one selectable dock on a display monitor, selecting a target dock for docking a watercraft in an auto-docking mode in response to a user input selecting a selectable dock on the map image using a user interface, generating, a docking path from a current location of the watercraft to a target location of the target dock using a digital controller, and autonomously navigating the watercraft using an autopilot system along the docking path until the watercraft reaches the target location of the target dock.

Also, other features, aspects and advantages of the disclosed watercraft auto-docking system and the disclosed watercraft auto-docking method will become apparent to those skilled in the watercraft field from the following detailed description, which, taken in conjunction with the annexed drawings, discloses several illustrative embodiments of a watercraft auto-docking system and a watercraft auto-docking method with various features.

BRIEF DESCRIPTION OF THE DRAWINGS

Referring now to the attached drawings which form a part of this original disclosure, watercrafts are illustrated having a watercraft control system for auto-docking.

Figure 1:
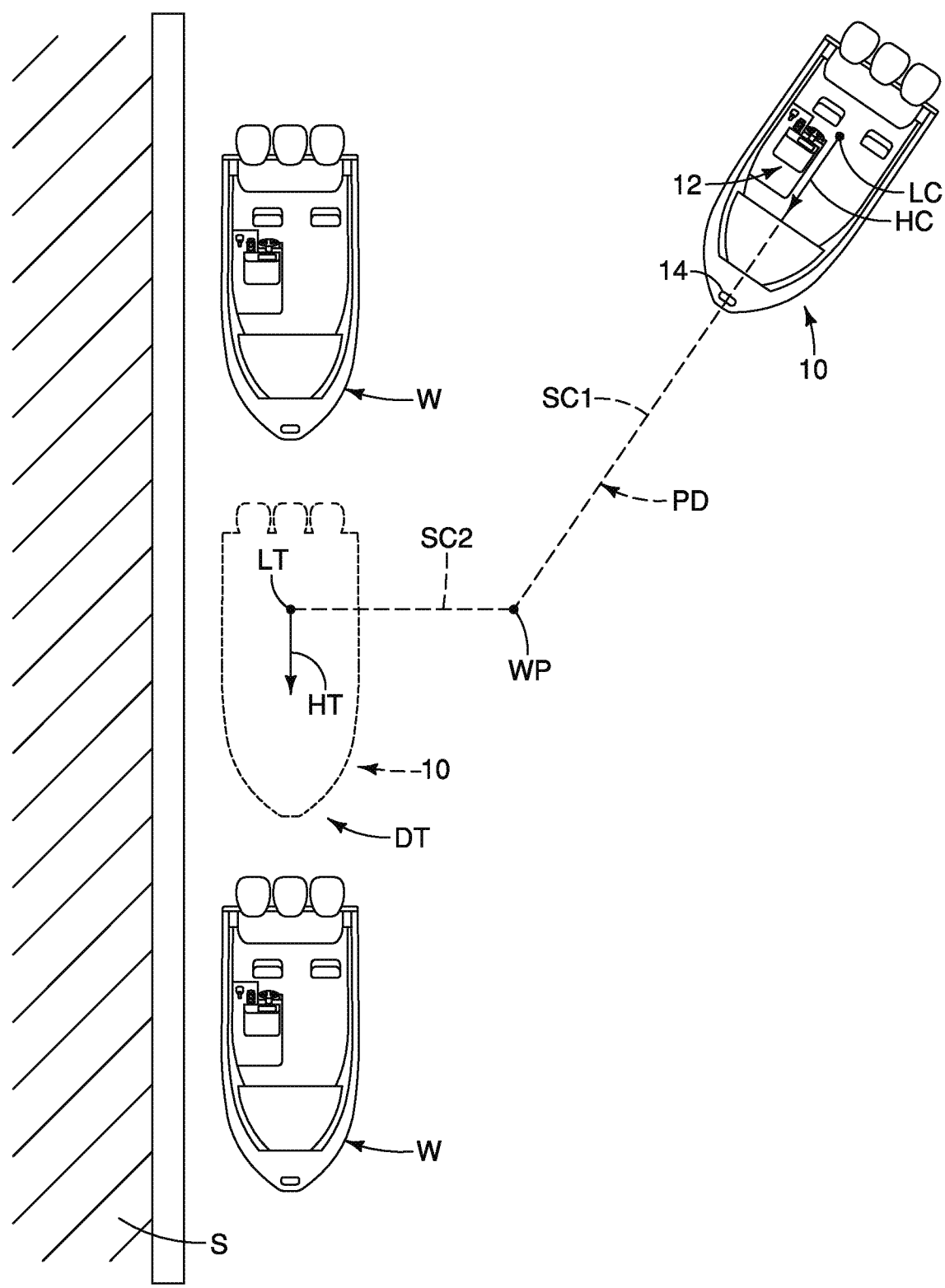
FIG. 1 is a schematic top view of a watercraft equipped with a watercraft control system (e.g., a watercraft auto-docking system) in which the watercraft is autonomously navigated to a target dock along a docking path in accordance with the present disclosure, illustrating the watercraft being docked by a side docking.

It should be noted that these figures are intended to illustrate the general characteristics of methods, structures and/or materials utilized in certain illustrative embodiments and to supplement the written description provided below. These drawings are not, however, to scale and may not precisely reflect the precise structural or performance characteristics of any given embodiment and should not be interpreted as defining or limiting the range of values or properties encompassed by illustrative embodiments. The use of similar or identical reference numbers in the various drawings is intended to indicate the presence of a similar or identical element or feature.

DETAILED DESCRIPTION OF EMBODIMENTS

Selected embodiments will now be explained with reference to the drawings. It will be apparent to those skilled in the watercraft field from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

Figure 2A:
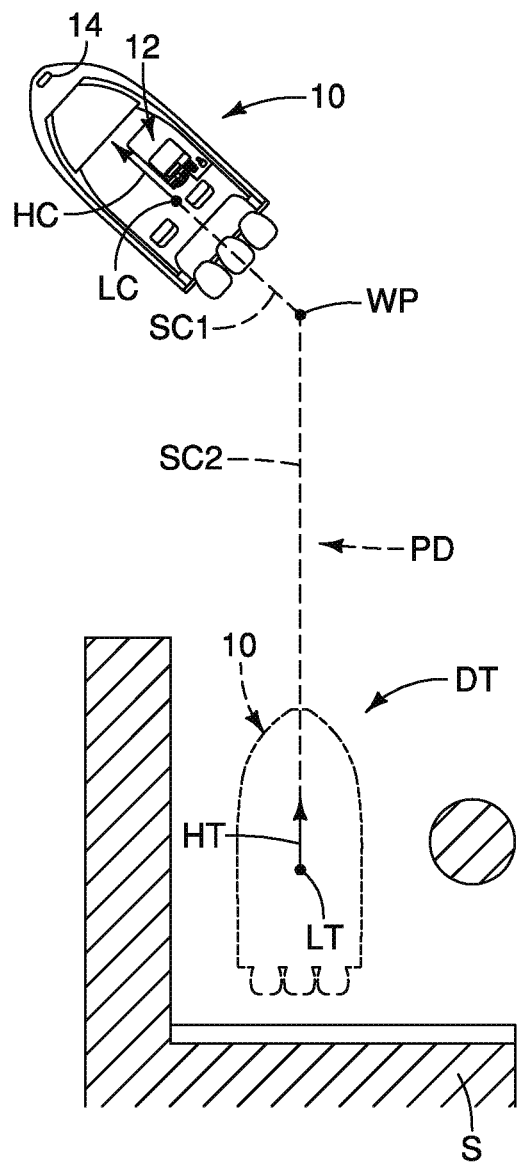
FIG. 2A is a schematic top view of the watercraft equipped with the watercraft control system, illustrating the watercraft being docked to a target dock by a reverse or stern-first slip docking.
Figure 2B:
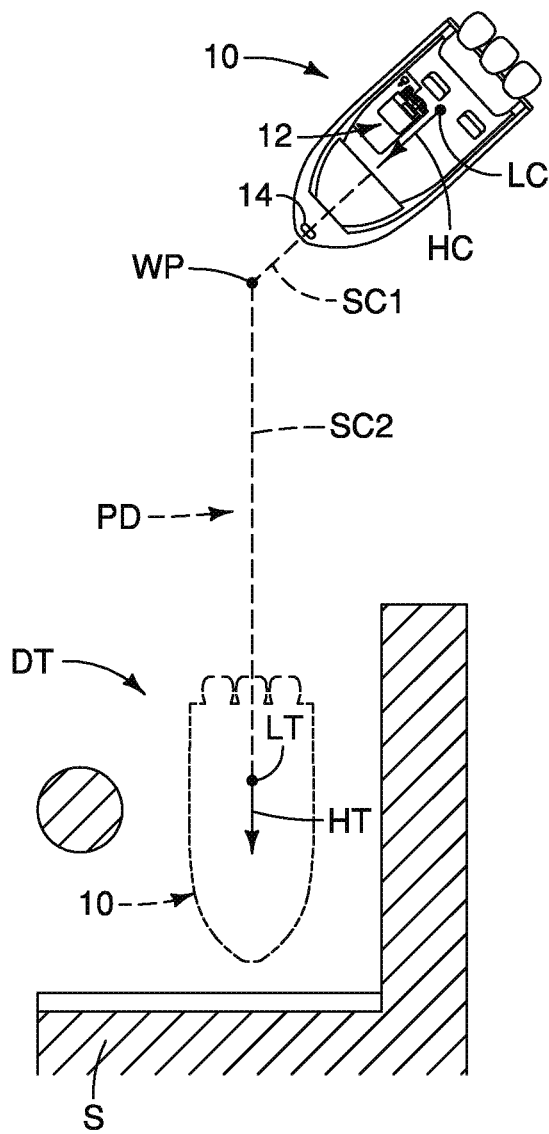
FIG. 2B is a schematic top view of the watercraft equipped with the watercraft control system, illustrating the watercraft being docked to a target dock by a forward or bow-first slip docking.

Referring initially to FIGS. 1, 2A and 2B, a watercraft 10 is illustrated in accordance with a first embodiment. The watercraft 10 includes a watercraft control system 12 (e.g., a watercraft auto-docking system) that is configured to autonomously navigate the watercraft 10 to a target dock DT along a docking path PD in an auto-docking mode. The watercraft control system 12 can be integrated with a main watercraft control system of the watercraft 10, or can be an add-on watercraft control system that supplements the main watercraft control system of the watercraft 10. In either case, the watercraft 10 is equipped with the watercraft control system 12 for auto-docking of the watercraft 10. In the illustrated embodiment, the term "dock" as used herein means not only a spacing or area of water between or next to one or a group of mooring structures S, such as pier, quay, jetty, wharf, or other fixtures, to which a watercraft can be moored, as shown in FIGS. 1, 2A and 2B, but also a spacing or area of water at which a watercraft can maintain its position relative to a stationary or anchored object on water. Here, the stationary or anchored object on water can be an anchored buoy, a watercraft that is stopping with or without being anchored, etc.

Here, in the first embodiment, the watercraft control system 12 of the watercraft 10 includes an onboard detector 14 that is configured to detect peripheral environment of the watercraft 10 in real-time. Preferably, the detector 14 includes one or more active sensors such as lasers, lidar, or millimeter-wave radars as shown in the first embodiment. However, the detector 14 can also include an image recognition device and/or optical sensors such as one or more cameras. In particular, in the illustrated embodiment, the detector 14 includes a lidar sensor to create a point cloud for detecting peripheral environment of the watercraft 10 in real-time and for generating a map image about the watercraft 10. Furthermore, the detector 14 can also include one or more cameras for generating more realistic map image about the watercraft 10 by overlaying a camera image onto the point cloud.

Figure 3:
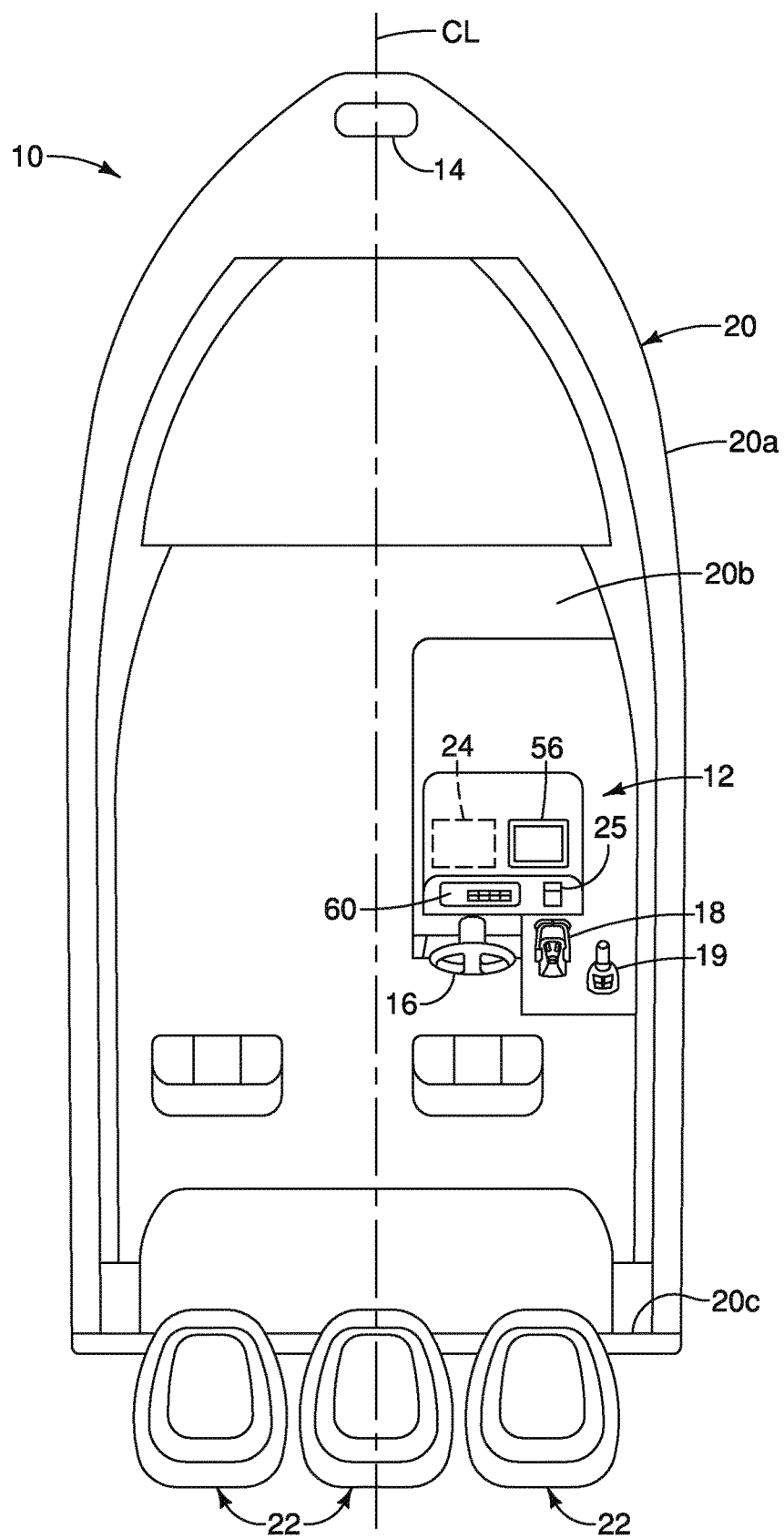
FIG. 3 is a simplified top view of the watercraft including the watercraft control system in accordance with the present disclosure.

The watercraft 10 is further configured to be driven in an autopilot mode or a manual mode. Here, the watercraft 10 is provided with a drive-by-wire system that operates the watercraft 10, and that is configured to perform various operations of the watercraft 10. Specifically, as shown in FIG. 3, the watercraft 10 is provided with a cockpit that has a steering wheel or helm 16 and a remote control 18. The steering wheel 16 is used by a driver or user (hereinafter merely referred to as a "user") of the watercraft 10 to manually turn the watercraft 10, and thus, manually change a propulsion direction of the watercraft 10. The remote control 18 is used by the user to manually control a propulsion force of the watercraft 10. Furthermore, as shown in FIG. 3, the cockpit has a joystick 19 that is used by the user to simultaneously control a steering and a propulsion force of the watercraft 10 to Move and turn the watercraft 10 in any direction. In the autopilot mode, the user sets a cruising speed for the watercraft 10 and a travel path defined by waypoints in a conventional manner. In particular, in the autopilot mode, the main watercraft control system of the watercraft 10 servers as an autopilot system of the watercraft 10, and is configured to autonomously navigate the watercraft 10 at the preset cruising speed along the travel path. However, of course, the autopilot system can be integrated with the watercraft control system 12 as needed and/or desired.

With this configuration, in the illustrated embodiment, in the auto-docking mode, once the target dock DT is selected and the docking path PD from a current location of the watercraft 10 (i.e., a current location LC) to a location of the target dock DT (i.e., a target location LT) is generated, then the watercraft 10 is driven using the autopilot system such that the watercraft 10 is autonomously navigated to the target location LT of the target dock DT along the docking path PD. Here, since the watercraft 10 is navigated to reach the target location LT of the target dock DT in the auto-docking mode, the target location LT of the target dock DT can also be referred to as the target location LT of the watercraft 10 in the auto-docking mode.

Specifically, as explained later in more detail, the watercraft control system 12 provides the user of the watercraft 10 with an option to activate the auto-docking mode. If the auto-docking mode is activated, then the watercraft control system 12 searches peripheral docks that are located within a predetermined distance from the current location LC of the watercraft 10. If no peripheral dock is found, then the watercraft control system 12 does not engage an auto-docking control, and ends an operation of the watercraft 10 in the auto-docking mode. On the other hand, when at least one peripheral dock is found and one is selected as the target dock DT, then the watercraft control system 12 automatically generates the docking path PD from the current location LC of the watercraft 10 to the target location LT of the target dock DT, and engages the auto-docking control to autonomously navigate the watercraft 10 to the target location LT of the target dock DT along the docking path PD using the autopilot system. When the watercraft 10 reaches the target location LT of the target dock DT, then the watercraft control system 12 stops the watercraft 10. Specifically, the watercraft control system 12 disengages the auto-docking control, ends the operation of the watercraft 10 in the auto-docking mode, and switches the operation of the watercraft 10 from the auto-docking mode to a predetermined control mode (e.g., a user-specified mode). For example, the predetermined control mode includes a stay point mode, a caterpillar mode, a joystick mode, a normal manual mode. etc. In the stay point mode, the watercraft 10 is autonomously navigated to remain stationary and maintain its location. In the caterpillar mode, the watercraft 10 is autonomously navigated to maintain the distance from a mooring structure S next to the target dock DT while allowing movement of the watercraft 10 along the mooring structure S. In the joystick mode, the watercraft 10 is navigated according to a user's manual input using the joystick 19. In the normal manual mode, the watercraft 10 is navigated according to a user's manual input using the steering wheel 16 and/or the remote control 18. In the illustrated embodiment, after the auto-docking control is engaged, the user of the watercraft 10 does not need to input any control commands (i.e., hands free) unless the watercraft control system 12 experiences a failure or the user of the watercraft 10 wants to disengage the auto-docking control.

FIGS. 1, 2A and 2B illustrate various types of docking operations in the auto-docking mode. FIG. 1 illustrates the watercraft 10 being docked by a "side docking" in the auto-docking mode. With this side docking, as shown in FIG. 1, the watercraft 10 is autonomously navigated to the target location LT of the target dock DT, and autonomously stops a predetermined distance 0.6 meters (or 2 feet)) away from the mooring structure S, for example. FIG. 2A illustrates the watercraft 10 being docked by a "reverse or stem-first slip docking," while FIG. 2B illustrates the watercraft 10 being docked by a "forward or bow-first slip docking". With these slip dockings, as shown in FIGS. 2A and 2B, the watercraft 10 is autonomously navigated to the target location LT of the target dock DT while maintaining a predetermined distance (e.g., 0.6 meters (or 2 feet)) between the side objects and the sides of the watercraft 10, and autonomously stops a predetermined distance (e.g., 0.9 meters (or 3 feet)) away from the mooring structure S, for example. Furthermore, as shown in FIGS. 2A and 2B, the watercraft 10 remains stationary relative to the mooring structure S and maintains orthogonality relative to the mooring structure S while compensating for wind and/or current. Other than the side docking and the slip docking, the watercraft 10 can also be docked by a "vessel-to-vessel docking", a "buoy positioning", etc. With the vessel-to-vessel docking, the watercraft 10 is autonomously navigated to the target location LT of the target dock DT alongside other watercraft that is stopping with or without being anchored, and autonomously maintains the position of the watercraft 10 relative to the other watercraft while compensating for wind and/or current. With the buoy positioning, the watercraft 10 is autonomously navigated at a controlled cruising speed to the target location LT of the target dock DT next to a desired buoy or mooring location, and stops a predetermined distance (e.g., 0.9 meters (or 3 feet)) away from the desired buoy or mooring location until the watercraft 10 is moored, for example.

Referring to FIG. 3, a simplified top view of the watercraft 10 is illustrated, and some of the parts of the watercraft 10 will now be discussed. In the first embodiment, the watercraft 10 basically includes a watercraft body 20 and a plurality of propulsion units 22. The detector 14 is preferably mounted to the watercraft body 20 near the front end of the watercraft 10. Preferably, the detector 14 is disposed on a centerline CL of the watercraft body 20. However, the location of the detector 14 is not limited to the illustrated location.

Here, the watercraft 10 is illustrated as an outboard motor boat that is equipped with the watercraft control system 12. However, the watercraft control system 12 is not limited to being used with an outboard motor boat. Rather, as explained later, the watercraft control system 12 can be applied to practically any watercraft that includes a propulsion system and a steering system.

Here, the watercraft body 20 basically includes a hull 20a and a deck 20b. The deck 20b is provided on the hull 20a in a conventional manner. Preferably, the hull 20a and the deck 20b are integrated to form a unit. The hull 20a, the deck 20b and the other parts of the watercraft 10 are made of suitable materials that are typically used in watercrafts for a marine environment, and thus, the materials of the various parts of the watercraft 10 will not be discussed herein. However, the watercraft body 20 is not limited to the illustrated hull and deck construction. Rather, the construction of the watercraft body depends on the type of watercraft. For example, a watercraft body of a pontoon boat typically includes two or more pontoons that support a deck. Also, for example, the watercraft body may not have a deck.

Figure 4:
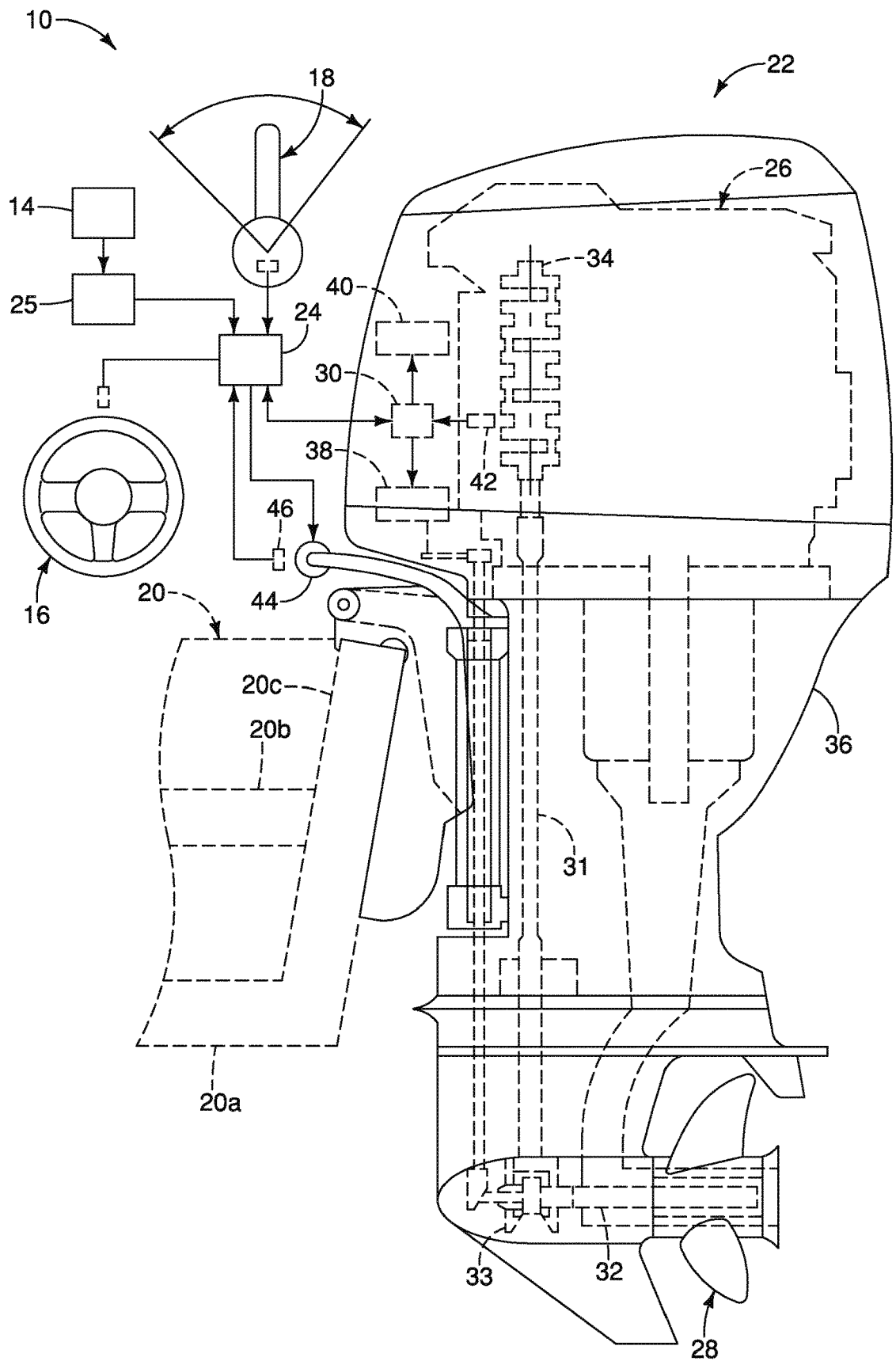
FIG. 4 is a simplified partial side view of a rear portion of the watercraft showing one of the propulsion units with various controls schematically illustrated.

The propulsion unit 22 is provided to propel the watercraft 10 in a conventional manner. In the first embodiment, three of the propulsion units 22 are provided in the form of three outboard motors as seen in FIG. 3 (only one of the propulsion units 22 is shown in FIG. 4). However, the propulsion units 22 are not limited to this illustrated configuration of the first embodiment. It is acceptable for the propulsion units to be inboard motors or water jet propulsion devices instead of outboard motors. Basically, the term "propulsion unit" as used herein is a machine that produces a thrust to push a watercraft. The propulsion unit can also be referred to as a propulsion device or a propulsion system. A propulsion unit or device typically includes a drive source (e.g., an engine or an electric motor) and a propulsor (e.g., a propeller or an impeller) that provide a thrust to the watercraft.

While the watercraft 10 is illustrated as having three of the propulsion units 22, it will be apparent from this disclosure that the watercraft 10 can have only a single propulsion unit, two propulsion units, or more than three propulsion units, as needed and/or desired, depending on the particular design of the watercraft. Also, the watercraft 10 can be provided with one or more other types of propulsion units such as one or more water-jet drives and/or inboard motors. In other words, the auto-docking mode of the watercraft control system 12 can be used with other types of propulsion systems other than the propulsion system illustrated in the first embodiment. In any case, the watercraft 10 comprises at least one propulsion unit that is provided to the watercraft body 20, and more preferably further comprises an additional propulsion unit 22 that is provided to the watercraft body 20.

The propulsion units 22 are controlled by the user using the steering wheel 16 to manually turn the watercraft 10, and using the remote control 18 to manually control a propulsion force (thrust) of the watercraft 10. The remote control 18 is also used by the user to reverse the direction of the thrusts of the propulsion units 22. Preferably, the propulsion units 22 can be independently turned with respect to each other. Also, the thrust of the propulsion units 22 can be independently controlled by the user. Here, the steering system of the watercraft 10 is a steer-by-wire system in which the steering wheel 16 is not mechanically connected to the propulsion units 22. However, the watercraft control system 12 can be adapted to a mechanical steering system. Likewise, the remote control 18 is not mechanically connected to the propulsion units 22. However, the watercraft control system 12 can be adapted to a watercraft having a mechanical throttle system. Since the steering systems and throttle systems are well known and the auto-docking mode of the watercraft control system 12 can be adapted to those known systems, the steering system and throttle system of the watercraft 10 of the first embodiment will only be briefly discussed herein.

Figure 5:
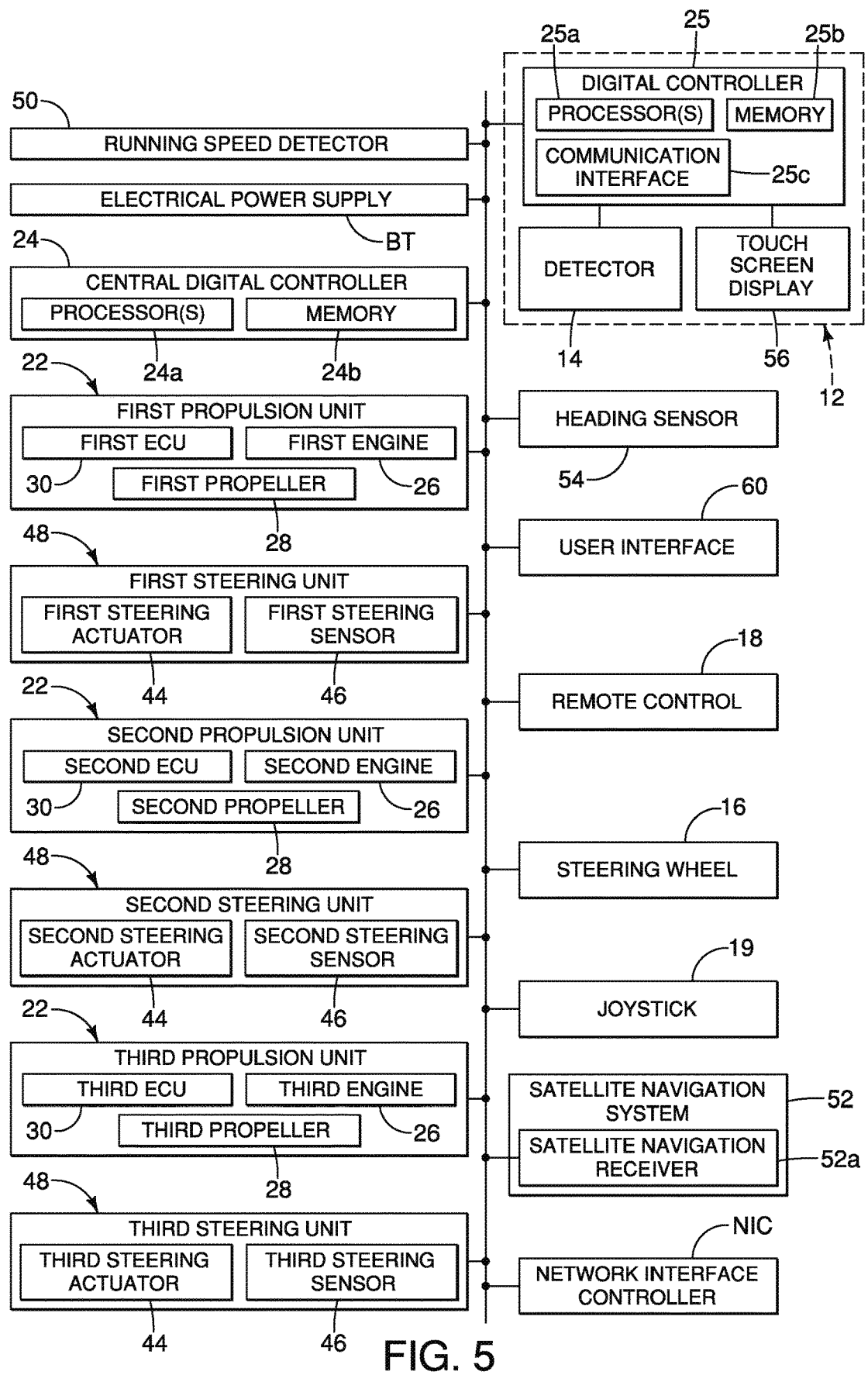
FIG. 5 is a block diagram of selected components of the watercraft equipped with the watercraft control system having a digital controller (graphics processing unit or GPU) that communicates with a central digital controller (boat control unit or BCU) of the watercraft.

FIG. 5 illustrates a block diagram of selected components of the watercraft 10. As schematically illustrated in FIG. 5, the watercraft 10 is provided with a central digital controller 24 that is connected to a network of the watercraft 10, and the watercraft control system 12 includes a digital controller 25 that is connected to the network of the watercraft 10. For example, the network of the watercraft 10 can be Controller Area Network (CAN bus) that allow microcontrollers and devices to communicate with each other. The central digital controller 24 can be also referred to as a boat control unit (BCU), while the digital controller 25 can be also referred to as a graphics processing unit (GPU). In FIG. 5, the watercraft control system 12 is illustrated as an add-on component of the watercraft 10. However, some or all of the functions of the digital controller 25 (GPU) could be integrated into the central digital controller 24 (BCU). Thus, the term "digital controller" is not limited to a single controller having one or more processors, but rather includes one controller as well as two or more controllers that are physically separated from each other. Thus, for example, the term "digital controller" can include a GPU by itself, the BCU by itself or both the GPU and the BCU.

Also as seen in FIG. 5, the watercraft 10 is provided with an electrical power supply BT (e.g., a battery) for supplying electrical power the central digital controller 24 and the digital controller 25 as well as to the various electrical components of the watercraft 10. Of course, the digital controller 25 can have its own electrical power supply (e.g., a battery) if desired.

The central digital controller 24 can be a microcomputer. The central digital controller 24 includes a processor 24a, such as a CPU (Central Processing Unit) and memory 24b (computer storage) such as a ROM (Read Only Memory) and a RAM (Random Access Memory). The central digital controller 24 can also include other conventional components such as an input interface circuit and an output interface circuit. The processor 24a of the central digital controller 24 is programmed to control the various components of the watercraft 10 such as adaptive cruise control, autopilot control, satellite positioning control, etc. The memory 24b of the central digital controller 24 stores processing results, detection results and control programs such as ones for controlling the watercraft 10. For example, the RAM stores statuses of operational flags and various control data, while the ROM stores the control programs for various operations.

In the illustrated embodiment, the central digital controller 24 is programmed to control the propulsion units 22 in accordance with operation signals from the steering wheel 16 and the remote control 18 as well as control signals or settings from the watercraft control system 12. The basic controls of the propulsion units 22 in accordance with the operation signals from the steering wheel 16 and the remote control 18 are relatively conventional, and thus, the basic controls of the propulsion units 22 will not be discussed in detail herein. The central digital controller 24 is also programmed to automatically control the at propulsion units 22 based on detection results of sensors or detectors.

While the central digital controller 24 and the watercraft control system 12 are illustrated as separate components in which the watercraft control system 12 is connected to the network of the watercraft 10, the watercraft control system 12 can be integrated with the central digital controller 24. In other words, here, the watercraft control system 12 is an add-on component that is plugged into the network of the watercraft 10. Thus, as illustrated in FIG. 5, the watercraft control system 12 includes its own digital controller 25 having at least one processor 25a, such as a CPU (Central Processing Unit) and a memory 25b (e.g., a computer storage or memory) such as a ROM (Read Only Memory) and a RAM (Random Access Memory). On the other hand, if the watercraft control system 12 is fully integrated into the watercraft 10, then the watercraft control system 12 can use the central digital controller 24 to carry out the auto-docking mode.

The digital controller 25 is configured to communicate with the detector 14 to receive a detection signal from the detector 14. Here, for example, the digital controller 25 is provided with a communication interface 25c (e.g., an I/O interface) that is used to communicate with the detector 14 either wirelessly or via a wired connection to the network of the watercraft 10. Thus, the digital controller 25 can also communicate with the onboard computer system of the watercraft 10 via the communication interface 25c. Here, for example, the digital controller 25 is plugged into a network interface controller NIC (e.g., a MicroAutoBox by dSpace), and the detector 14 is plugged into a USB port of the communication interface 25c of the digital controller 25. The processor 25a of the digital controller 25 (the GPU) communicates with the digital controller 24 (the BCU). In this way, the digital controller 25 can communicate with the central digital controller 24 as well as communicate with the other components of the watercraft 10 that are connected to the network of the watercraft 10.

Here, as described above, the detector 14 includes the lidar sensor, for example, and detects the peripheral environment of at least 30 meters (or 100 feet) around the watercraft 10. Specifically, the detector 14 can detects the presence of the mooring structures S and the obstructs, such as other watercrafts W, as well as the distance from the watercraft 10 to the mooring structures S and the obstructs. As described above, using the detection results of the detector 14, the digital controller 25 generates the map image around the watercraft 10. This map image can be utilized for selection of the target dock DT, as described later in detail.

Still referring to FIG. 5, each of the propulsion units 22 basically includes an internal combustion engine 26 (i.e., a drive source) and a propeller 28 (i.e., a propulsory. Here, each of the propulsion units 22 further includes an engine control unit 30 (ECU). Alternatively, for example, the engine control units 36 can be omitted and the control of the internal combustion engines 26 (hereinafter "the engines 26") can be performed by the central digital controller 24. Here in FIG. 5, the engines 26 are referred to as first engine, second engine and third engine to distinguish the engines 26. Likewise, in FIG. 5, the propellers 28 are referred to as first propeller, second engine and third propeller. Also, in FIG. 5, the engine control units 36 are referred to as first ECU, second ECU and third ECU. Each of the engine control units 30 is a digital controller similar in configuration to the configuration of the central digital controller 24 that is previously discussed. Each of the engine control units 30 is programmed to control its respective propulsion unit 22 to independently generate the propulsion forces of the propulsion units 22, respectively, and to independently steer or turn the propulsion units 22, respectively, in order to propel and steer the watercraft 10.

Referring back to FIG. 4, one of the propulsion units 22 is illustrated in more detail. Since the construction of the propulsion units 22 are the same, the description of the propulsion unit 22 illustrated in FIG. 4 also applies to the other propulsion units 22. The propulsion unit 22 is mounted to a rear portion 20c of the hull 20 in a conventional manner. The engine 26 is connected to the propeller 28 via a drive shaft 31 and a propeller shaft 32. The propeller shaft 32 is connected to the drive shaft 31 through a drive transmission 33. The engine 26 rotates the propeller 28 via the drive shaft 31 and the propeller shaft 32 to generate a thrust for propelling the watercraft 10. The drive transmission 33 switches the rotational direction of the power to be transmitted from the drive shaft 31 to the propeller shaft 32. The drive transmission 33 includes, for instance, a plurality of gears and a clutch that changes meshing of the gears. The drive shaft 31 is operatively connected to a crankshaft 34 of the engine 26 so that rotation of the crankshaft 34 is transmitted to the drive shaft 31 which in turn transmits rotation to the propeller shaft 32 to rotate the propeller 28. The engine 26, the drive shaft 31, the propeller shaft 32 and the drive transmission 33 are provided in a housing 36.

The propulsion unit 22 is provided with a shift actuator 38 that is electrically connected to the engine control unit 30 as seen in FIG. 4. The shift actuator 38 includes, for example, an electric motor or other types of actuators that is configured to switch an operating position of the drive transmission 33 of the propulsion unit 22 to a forward position to generate a forward propulsion force, a reverse position to generate a reverse propulsion force, or a neutral position. Thus, the shift actuator 38 is configured to operate the drive transmission 33 to change rotational direction of the propeller shaft 32 and the propeller 28 between a forward drive thrust and a reverse drive thrust. Preferably, the shift actuator 38 is an electric actuator that is electrically controlled by the engine control unit 30. The engine control unit 30 is programmed to operate the shift actuator 38 to control the drive transmission 33 based on a control signal received from the central digital controller 24.

The propulsion unit 22 is also provided with a throttle actuator 40 that is electrically connected to the engine control unit 30 as seen in FIG. 4. The throttle actuator 40 includes, for example, an electric motor or other types of actuators for change the output of the engine 26. Namely, the throttle actuator 40 changes an opening degree of a throttle valve to adjust the output or speed of the engine 26. Preferably, the throttle actuator 40 is an electric actuator that is electrically controlled by the engine control unit 30. The propulsion unit 22 is also provided with an engine speed sensor 42 that detects a rotational speed of the crankshaft 34 of the engine 26 to determine an engine rotational speed of the engine 26. The detection signal of the engine speed sensor 42 is transmitted to the engine control unit 30, the central digital controller 24 and/or the digital controller 25. The engine control unit 30 is programmed to operate the throttle actuator 40 to control the speed of the engine 26 based on a control signal received from the central digital controller 24.

The propulsion unit 22 is also provided with a steering actuator 44 that is electrically connected to the engine control unit 30 as seen in FIG. 4. The steering actuator 44 includes, for example, a hydraulic or electric cylinder, or other types of actuators that is provided to turn the propulsion unit 22 relative to the watercraft 10. The propulsion unit 22 is also provided with a steering angle sensor 46 that detects a steering angle of the propulsion unit 22. The steering angle sensor 46 can be, for example, a stroke sensor of the hydraulic cylinder of the steering actuator 44. The steering angle sensor 46 transmits the detection result to the engine control unit 30, the central digital controller 24 and/or the digital controller 25. The engine control unit 30 is programmed to operate the steering actuator 44 to control the propulsion direction of the watercraft 10.

In the first embodiment, a user input provided to the steering wheel 16 is electronically communicated through the central digital controller 24. A steering sensor (not shown) is in communication with at least one of the steering wheel 16 and a steering shaft that is associated with the steering wheel 16. The steering sensor 46 is arranged to provide a signal indicative of a rotational position, angular position, input force, or input torque applied to at least one of the steering wheel 16 or a steering shaft (not shown) associated with the steering wheel 16 to the central digital controller 24. The central digital controller 24 is arranged to receive the signal and provide commands or signals to the engine control units 30 of the propulsion units 22 and/or the steering actuator 44 to move the propulsion units 22 as a rudder. However, when the watercraft control system 12 is in the auto-docking mode, the user inputs are not needed, and the propulsion units 22 and/or the steering actuator 44 are controlled by the central digital controller 24, which serves as the autopilot system, based on the detection signals from the detector 14 and various sensors.

As seen in FIG. 5, for example, the watercraft 10 can be provided with a running speed detector 50 (e.g., a GPS speedometer, a pitot speedometer, etc.), a satellite navigation receiver 52a (e.g., a Global Positioning System (GPS) receiver, a Navigation Satellite System (NSS) receiver, or a Global Navigation Satellite System (GNSS) receiver) of a satellite navigation system 52, and a heading sensor 54 (e.g., on-board gyro and tilt sensors). The running speed detector 50, the satellite navigation receiver 52a and the heading sensor 54 can be integrated into a single unit that provides speed data, heading data and position data. The running speed detector 50, the satellite navigation receiver 52a and the heading sensor 54 are connect to the central digital controller 24 and/or the digital controller 25 by the network of the watercraft 10 so that signals are communicated to the central digital controller 24 and/or the digital controller 25 via the network of the watercraft 10. The speed of the watercraft 10 can be provided to the central digital controller 24 and/or the digital controller 25 by a detection signal from the running speed detector 50, or can be provided to the central digital controller 24 and/or the digital controller 25 by a GNSS signal that is received by the satellite navigation receiver 52a. The position or location of the watercraft 10 can be provided to the central digital controller 24 and/or the digital controller 25 based on the GNSS signal that is received by the satellite navigation receiver 52a. The heading of the watercraft 10 can be provided to the central digital controller 24 and/or the digital controller 25 based on the heading sensor 54. Thus, the central digital controller 24 and/or the digital controller 25 receives the speed of the watercraft 10, the position or location of the watercraft 10, and the heading of the watercraft 10 based on detection results from various receivers, detectors and/or sensors.

Figure 6:
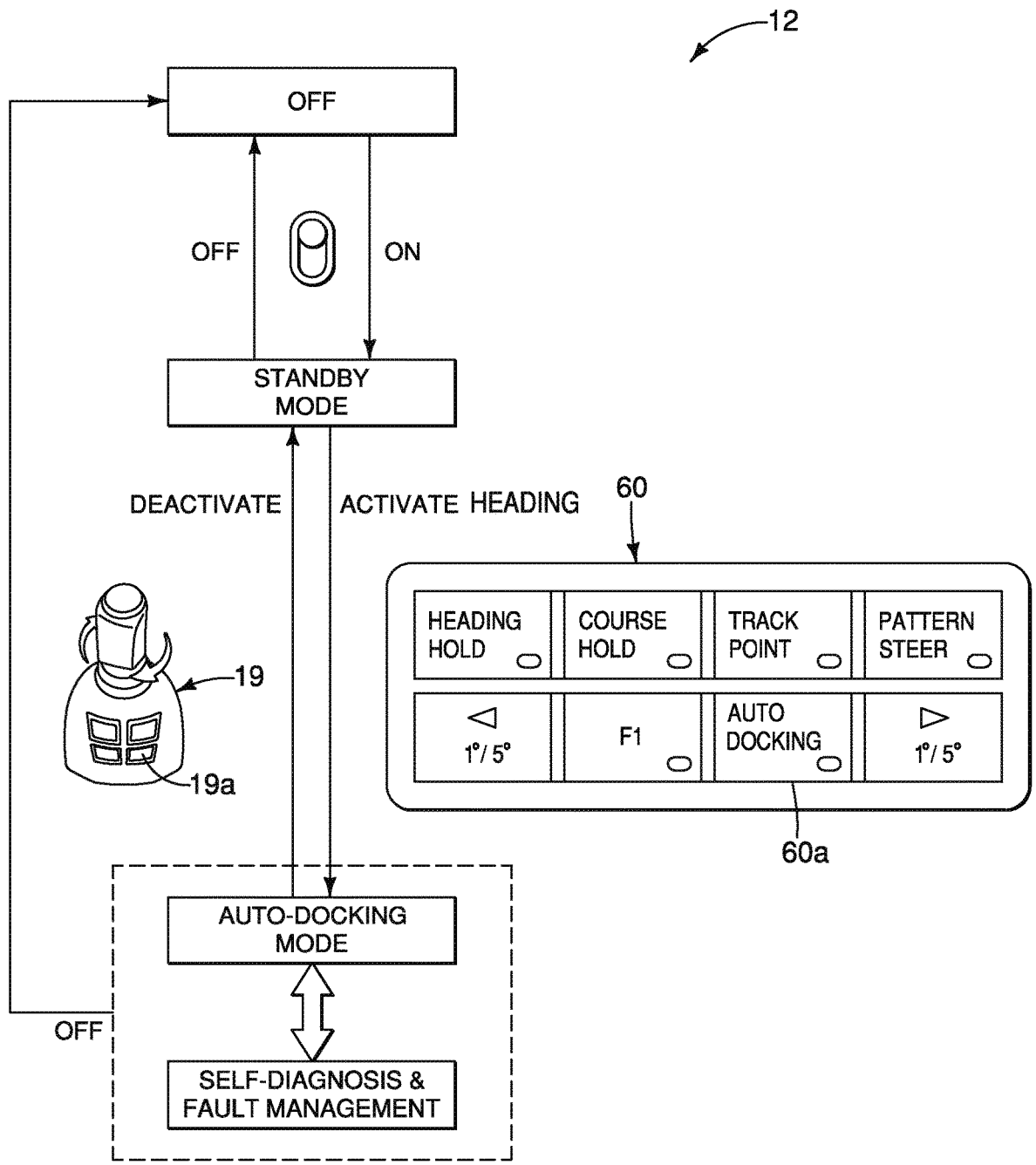
FIG. 6 is a simplified high level logic diagram illustrating the auto-docking mode executed by the watercraft control system.

As seen in FIG. 6, the watercraft control system 12 further comprises a user interface such as a touch screen display 56 (e.g., a display monitor), a control panel 60 and the joystick 19. The touch screen display 56 has a processor that communicates with the processor 25a of the digital controller 25 via the connection through the communication interface 25c and a display screen or touch screen 56a such that the touch screen display 56 displays the map image generated based on the detection signals from the detector 14 as well as other information related to the auto-docking mode.

The control panel 60 is provided on the watercraft body 20 and communicates with the central digital controller 24 and/or the digital controller 25. Specifically, the control panel 60 is programmed to be used to operate with the central digital controller 24 and/or the digital controller 25. The control panel 60 has physical control buttons that are assigned to various control of the watercraft 10 in the autopilot mode and the auto-docking mode. In the illustrated embodiment, a control button 60a is assigned to the activation of the auto-docking mode. The joystick 19 is provided on the watercraft body 20 and communicates with the central digital controller 24 and/or the digital controller 25. Specifically, the joystick 19 is programmed to be used to operate with the display monitor 56 and the central digital controller 24 and/or the digital controller 25. The joystick 19 has physical control buttons that are assigned to various control of the watercraft 10. In the illustrated embodiment, a control button 19a is assigned to the activation of the auto-docking mode. In this way, the user can use the control panel 60 and/or the joystick 19 to activate and deactivate the auto-docking mode. Alternatively or additionally, the watercraft control system 12 can use a multifunction display that is built into the watercraft 10 instead of or in conjunction with the touch screen display 56. The multifunction display of the watercraft 10 can be a touch screen display, or a display without a touch screen, and one or more knobs and/or buttons, and can be programmed to activate and deactivate the auto-docking mode. In the illustrated embodiment, an example will be shown in which user inputs or selections in the auto-docking mode are performed through touch operations relative to the touch screen display 56 using user's fingers or other indicators. However, these user inputs or selections in the auto-docking mode can also be performed through operations using the control panel 60, the joystick 19 and/or the multifunction display, as needed and/or desired.

Referring now to FIGS. 6 to 12, the auto-docking mode executed by the watercraft control system 12 will now be discussed. As seen in FIG. 6, a state transition logic is illustrated for the watercraft control system 12. When the watercraft 10 is started, the central digital controller 24 and the digital controller 25 are initialized and various other components are automatically activated including the detector 14. Before the user activates the auto-docking mode, the watercraft control system 12 will enter a standby mode. In the standby mode, the watercraft control system 12 waits for the user to activate the auto-docking mode by pressing the control button 19a of the joystick 19, the control button 60a of the control panel 60, etc.

Once the user presses the control button 19a of the joystick 19 or the control button 60a of the control panel 60, the digital controller 25 activates the auto-docking mode to engage the auto-docking control to navigate the watercraft 10 for auto-docking. While engaging the auto-docking control, there are no necessary inputs required from the user, unless the watercraft control system 12 experiences a failure or the user wants to disengage the auto-docking control.

Figures 7, 8:
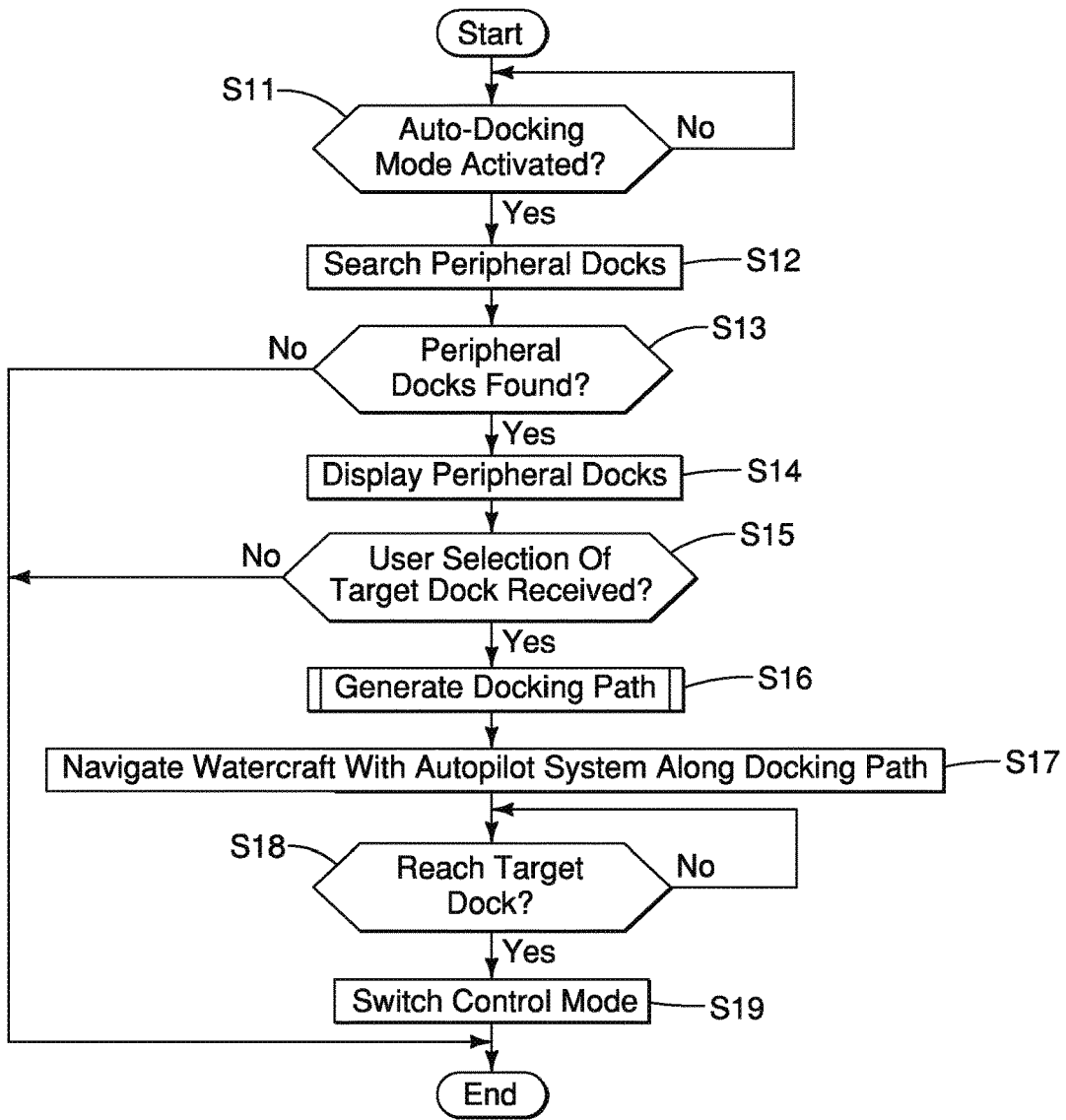
FIG. 7 is a flow chart of the auto-docking mode executed by the watercraft control system.
FIG. 8 is a schematic diagram illustrating a dock list that stores coordinate information and orientation information for each dock.

FIG. 7 is a flowchart illustrating the operation of the watercraft 10 in the auto-docking mode. As mentioned above, when the watercraft 10 is started, the watercraft control system 12 will enter the standby mode (step S11). In the standby mode, the watercraft control system 12 waits for the user to activate the auto-docking mode by pressing the control button 19a of the joystick 19 or the control button 60a of the control panel 60. If the digital controller 25 of the watercraft control system 12 detects that the control button 19a or the controller button 60a is pressed, then the digital controller 25 activates the auto-docking mode ("Yes" in step S11).

At the time of the auto-docking mode being activated, the digital controller 25 receives the current location LC of the watercraft 10 and a current heading HC of the watercraft 10 based on detection results from various receivers, detectors and/or sensors, as mentioned above. Furthermore, the digital controller 25 reads out a dock list 70 (see FIG. 8) that has been pre-stored in the memory 25b in advance, and searches peripheral docks that are located within a predetermined distance or search radius from the current location LC of the watercraft 10 in the dock list 70 (step S12). More specifically, as shown in FIG. 8, the dock list 70 is a pre-stored table information that stores coordinate information 72 and orientation information 74 for each dock that is registered in the dock list 70. The coordinate information 72 indicates the latitude and the longitude of each dock, for example. However, the coordinate information 72 can be in any type of format as long as it is indicating the dock location of each dock. The orientation information 74 indicates the compass direction in which the bow of a watercraft is pointed when the watercraft is moored at each dock (i.e., a normal mooring orientation at each dock). However, the orientation information 74 can be in any type of format as long as it is indicating the dock orientation of each dock.

In step S12, the digital controller 25 calculates the distance from the current location LC of the watercraft 10 to the dock location of each dock (i.e., the coordinate information 72) in the dock list 70, and searches the peripheral docks that are located within the search radius from the current location LC of the watercraft 10 based on the distance from the current location LC of the watercraft 10 to the dock location of each dock in the dock list 70. In particular, the digital controller 25 compares the distance from the current location LC of the watercraft 10 to the dock location of each dock with the search radius, and determines a dock whose distance from the current location LC of the watercraft 10 is less than the search radius as the peripheral dock. In the illustrated embodiment, the search radius is set to 100 meters, for example. However, the search radius is settable to any other suitable value as needed and/or desired.

Figure 9A:
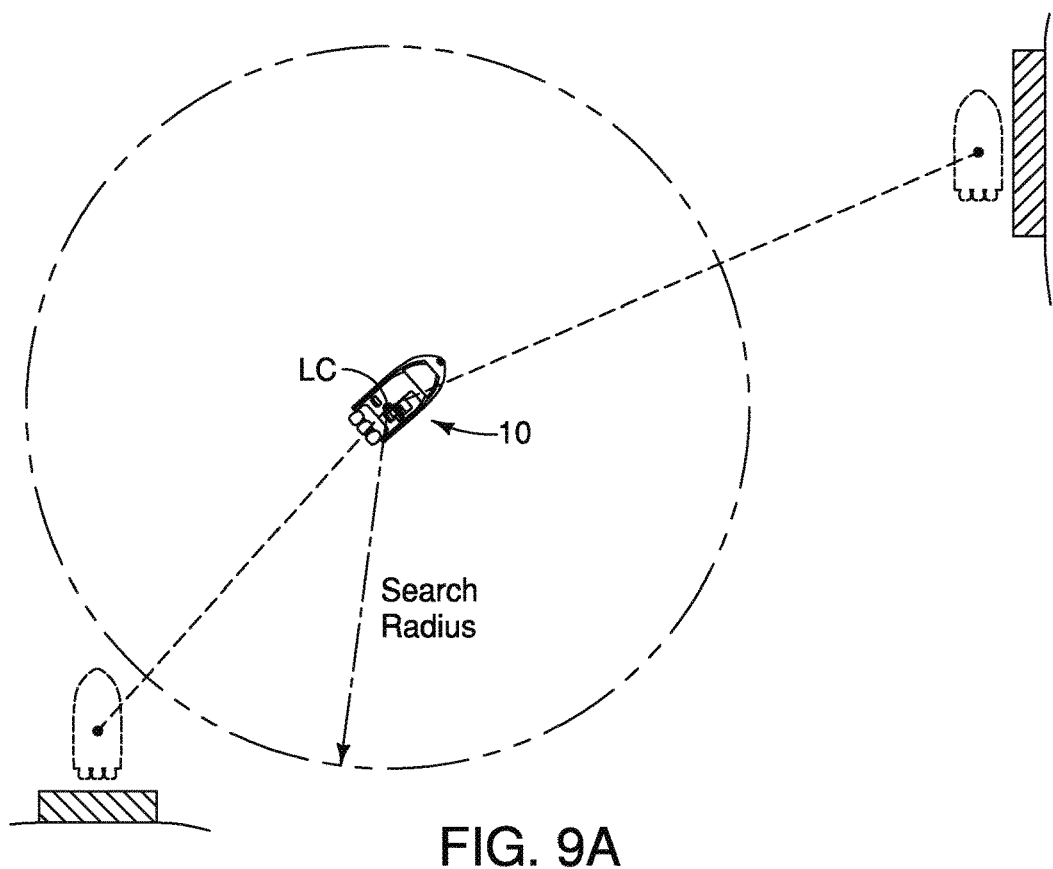
FIG. 9A is a schematic top view of the watercraft equipped with the watercraft control system, illustrating a situation in which there is no dock found within a search radius.

If no peripheral dock is found within the search radius ("No" in step S13), as illustrated in FIG. 9A, then the digital controller 25 does not engage the auto-docking control and ends an operation of the watercraft 10 in the auto-docking mode. Then, the watercraft control system 12 will return to the standby mode (step S11).

Figure 9B:
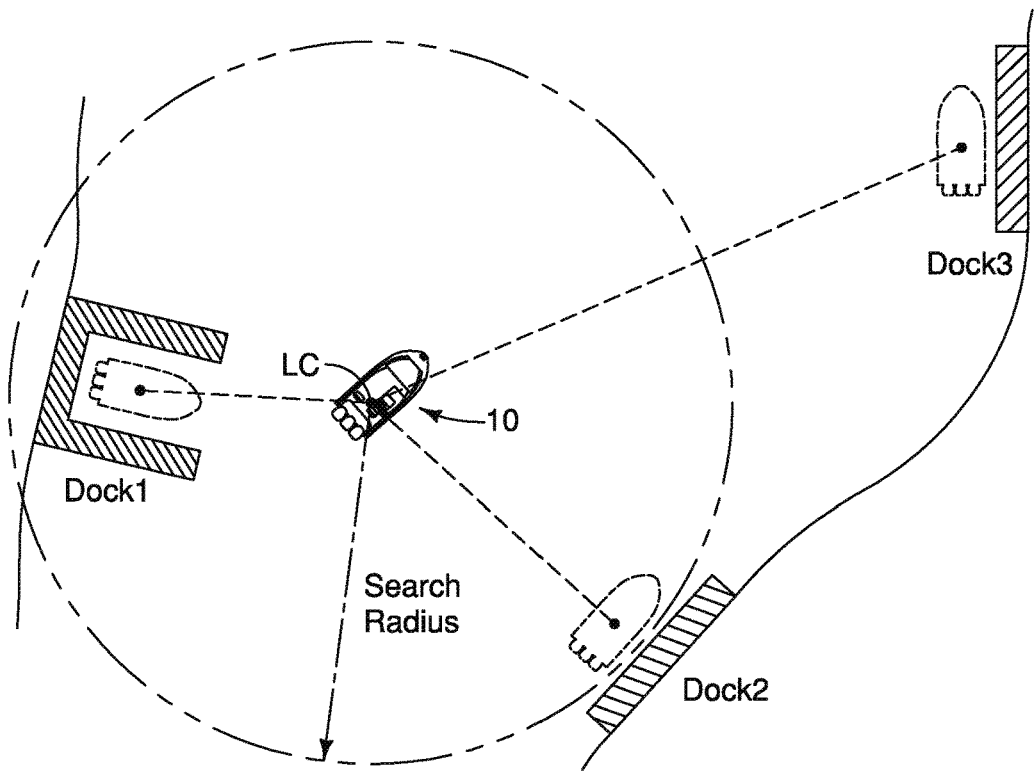
FIG. 9B is a schematic top view of the watercraft equipped with the watercraft control system, illustrating a situation in which peripheral docks are found within the search radius.
Figure 10A:
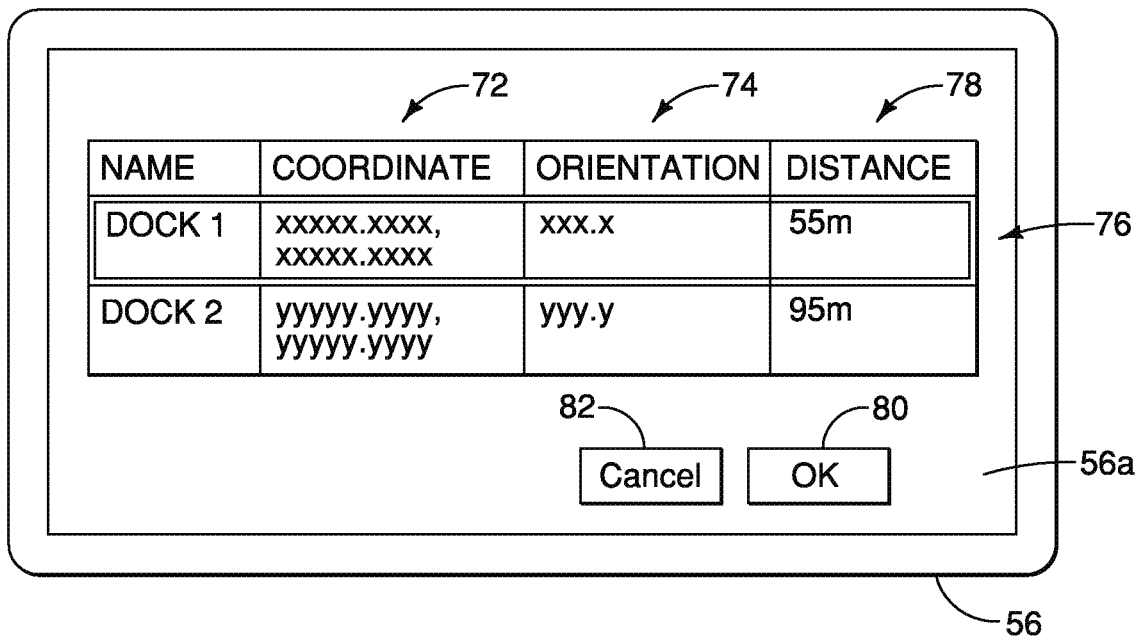
FIG. 10A is a screen shot of a candidate dock list displayed on a touch screen display, illustrating a situation in which a dock is being pre-selected as a target dock.

On the other hand, if at least one peripheral dock is found within the search radius ("Yes" in step S13), as illustrated in FIG. 9B, then the digital controller 25 sorts through the dock list 70 to display each peripheral dock as a candidate dock on the touch screen display 56 (step S14). For example, if the digital controller 25 finds two docks (i.e., "Dock 1" and "Dock 2") that are located within the search radius, as shown in FIG. 9B, then the digital controller 25 sorts through the dock list 70 and displays the dock information of the two docks (i.e., "Dock 1" and "Dock 2") in a candidate dock list 76 on the touch screen display 56, as shown in FIG. 10A. In this case, as understood from FIGS. 9B and 10A, the digital controller 25 does not display the dock information of a dock (i.e., "Dock 3") that is located out of the search radius on the touch screen display 56.

As shown in FIG. 10A, the dock information of the candidate dock list 76 includes the coordinate information 72 and the orientation information 74 of the two docks (i.e., "Dock 1" and "Dock 2") that are obtainable from the dock list 70 (FIG. 8). The dock information of the candidate dock list 76 also includes distance information 78 that indicates the distance from the current location LC of the watercraft 10 to the dock location of each of the two docks (i.e., "Dock 1" and "Dock 2").

In the illustrated embodiment, the digital controller 25 displays the candidate dock list 76 on the touch screen display 56 in a state in which the dock information of a candidate dock that is the closest to the current location LC of the watercraft 10 is automatically pre-selected or picked in advance. For example, as shown in FIG. 10A, the digital controller 25 displays the candidate dock list 76 in a state in which the dock information of the closest candidate dock (i.e., "Dock 1") is automatically pre-selected. In the illustrated embodiment, as shown in FIG. 10A, the pre-selection of the closest candidate dock (i.e., "Dock 1") is represented by surrounding a region showing the dock information of the closest candidate dock (i.e., "Dock 1") with a bold rectangle. However, of course, the pre-selection in the candidate dock list 76 can be represented in a different manner, such as highlighting, etc.

Here, in the illustrated embodiment, as shown in FIG. 10A, the candidate dock list 76 includes the dock information of each of the candidate docks (i.e., "Dock 1" and "Dock 2"). However, alternatively, the candidate dock list 76 can only include the dock information of the closest candidate dock (i.e., "Dock 1"). In either case, the digital controller 25 displays the candidate dock list 76 in a state in which the dock information of the closest candidate dock (i.e., "Dock 1") is automatically pre-selected.

After the digital controller 25 display each peripheral dock as a candidate dock on the touch screen display 56 (step S14), the digital controller 25 determines whether a user selection of a target dock DT for docking the watercraft 10 is received (step S15). Specifically, if the digital controller 25 receives a user selection of an OK button 80, which approves the pre-selected candidate dock (i.e., "Dock 1") as the target dock DT, from the touch screen display 56, then the digital controller 25 determines that the user selection of the target dock DT is received ("Yes" in step S15) and the process proceeds to step S16.

Figure 10B:
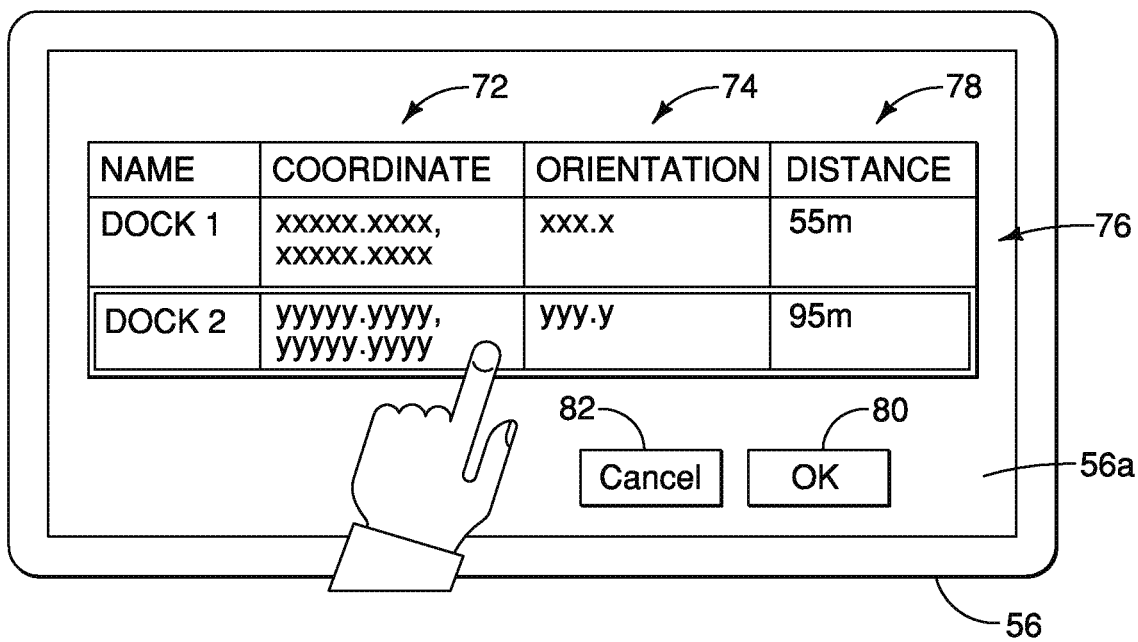
FIG. 10B is a screen shot of the candidate dock list displayed on the touch screen display, illustrating a situation in which another dock is being manually selected as a target dock.

Here, alternatively, in step S15, the digital controller 25 can further be configured to receive a user selection of other candidate dock (i.e., "Dock 2") other than the pre-selected candidate dock (i.e., "Dock 1") as the target dock DT from the touch screen 56a before receiving the user selection of the OK button 80. Specifically, as shown in FIG. 10B, if the user touches a region of the touch screen 56a showing the dock information of the other candidate dock (i.e., "Dock 2") while the digital controller 25 is displaying the candidate dock list 76, then the digital controller 25 displays the candidate dock list 76 such that the bold rectangle that was surrounding the dock information of the pre-selected candidate dock (i.e., "Dock 1") moves to surround the dock information of the other candidate dock (i.e., "Dock 2"). Then, if the digital controller 25 receives the user selection of the OK button 80 from the touch screen display 56, then the digital controller 25 determines that the user selection of the other candidate dock (i.e., "Dock 2") as the target dock DT is received ("Yes" in step S15) and the process proceeds to step S16.

On the other hand, if the digital controller 25 does not receive the user selection of the OK button 80 for a predetermined time period after displaying the candidate dock list 76 on the touch screen display 56 (i.e., a timeout) or if the digital controller 25 receives a user selection of a cancel button 82 from the touch screen display 56 ("No" in step S15), then the digital controller 25 does not engage the auto-docking control and ends an operation of the watercraft 10 in the auto-docking mode. In particular, the watercraft control system 12 will return to the standby mode (step S11).

Figure 11:
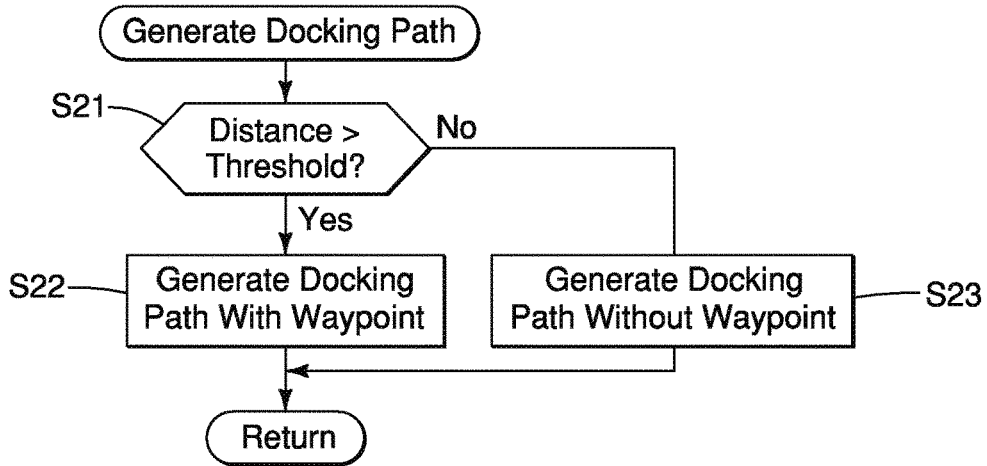
FIG. 11 is a flow chart of a docking path generation process of the auto-docking mode executed by the watercraft control system.

In step S16, the digital controller 25 generates the docking path PD from the current location LC of the watercraft 10 to the target location LT of the target dock DT. Specifically, in the illustrated embodiment, as shown in FIG. 11, the digital controller 25 first determines whether the distance from the current location LC of the watercraft 10 to the target location LT of the target dock DT is greater than a predetermined threshold (step S21). The predetermined threshold is set to 10 meter, for example. However, the predetermined threshold is settable to any other suitable value as needed and/or desired.

As shown in FIG. 11, if the digital controller 25 determines that the distance from the current location LC of the watercraft 10 to the target location LT of the target dock DI is greater than the predetermined threshold ("Yes" in step S21), then the digital controller 25 generates the docking path PD such that the docking path PD includes at least one waypoint WP between the current location LC of the watercraft 10 to the target location LT of the target dock DT (step S22).

Specifically, in step S22, the digital controller 25 generates the docking path PD such that the docking path PD includes a plurality of straight courses (i.e., straight routes or lines of travel) that are connected to each other at the at least one waypoint WP. More specifically, in the illustrated embodiment, the digital controller 25 generates the docking path PD such that the docking path PD includes a first straight course SC1 and a second straight course SC2 that are connected to each other by a single waypoint WP. However, the digital controller 25 can also generates the docking path PD such that the docking path PD includes three or more straight courses that are connected to each other by, a plurality of waypoints WP as needed and/or desired for avoiding obstructs.

For example, as shown in FIGS. 1, 2A and 2B, the digital controller 25 sets the single waypoint WP at an intersection of a first line and a second line. The first line extends in a direction parallel to the current heading HC of the watercraft 10 through the current location LC of the watercraft 10, for example, while the second line extends in a direction orthogonal to the mooring structure S next to the target dock DT through the target location LT of the target dock DT, for example. Thus, in this case, the first straight course SC1 extends along the first line from the current location LC of the watercraft 10 to the waypoint WP, while the second straight course SC2 extends along the second line from the waypoint WP to the target location LT of the target dock DT. Here, the first line and the second line can be set in different manner as needed and/or desired. For example, the first line can be a line that extends in a direction non-parallel to the current heading HC of the watercraft 10 through the current location LC of the watercraft 10. Also, for example, the second line can be a line that extends in a direction parallel to or non-orthogonal to the mooring structure S next to the target dock DT through the target location LT of the target dock DT. The second line can also be set according to a predetermined course of a final approach to the target location LT of the target dock DT, for example.

Furthermore, in step S22, the digital controller 25 generates the docking path PD such that the heading of the watercraft 10 is changed only at the single waypoint WP. Specifically, as shown in FIGS. 1, 2A and 2B, the digital controller 25 generates the docking path PD such that the current heading HC of the watercraft 10 is maintained while traveling along the first straight course SC1, such that the heading of the watercraft 10 is changed from the current heading HC of the watercraft 10 to a target heading HT (e.g., a target orientation) of the watercraft 10 at the single waypoint WP, and such that the target heading HT of the watercraft 10 is maintained while traveling along the second straight course SC2. Here, the target heading HT of the watercraft 10 is a desired heading of the watercraft 10 at the target location LT of the target dock DT, and is the same direction as the dock orientation of the target dock DT (i.e., the orientation information 74 of the target dock DT). Here, the docking path PD can be generated in different manner as needed and/or desired. For example, the digital controller 25 can first set the location of the waypoint WP at a predetermined distance from the target location LT of the target dock DT. This predetermined distance corresponds to a distance that is set as a setting item "Distance" in FIG. 30, as described later, for example. Then, the digital controller 25 can generate the docking path PD such that the docking path PD includes a first straight course SC1 that extends from the current location LC of the watercraft 10 to the waypoint WP and a second straight course SC2 that extends from the waypoint WP to the target location LT of the target dock DT.

In this case, the first straight course SC1 can extend along a first line that extends in a direction non-parallel to the current heading HC of the watercraft 10 through the current location LC of the watercraft 10. Thus, in this case, the digital controller 25 also generates the docking path PD such that the heading of the watercraft 10 is changed at the current location LT of the watercraft 10 and the waypoint WP. In particular, the digital controller 25 calculates a heading of the watercraft 10 that directs toward the waypoint WP from the current location LD of the watercraft 10. Then, the digital controller 25 generates the docking path PD such that the current heading HC of the watercraft 10 is changed to the heading that directs toward the waypoint WP at the current location LC of the watercraft 10, such that the heading that directs toward the waypoint WP is maintained while traveling along the first straight course SC1, such that the heading of the watercraft 10 is changed to the target heading HT of the watercraft 10 at the waypoint WP, and such that the target heading FIT of the watercraft 10 is maintained while traveling along the second straight course SC2.

In response to the digital controller 25 completing the generation of the docking path PD from the current location LC of the watercraft 10 to the target location LT of the target dock DT in step 22, the digital controller 25 engages the auto-docking control and the process proceeds to step S17 shown in FIG. 7.

On the other hand, as shown in FIG. 11, if the digital controller 25 determines that the distance from the current location LC of the watercraft 10 to the target location LT of the target dock DT is not greater than the predetermined threshold ("No" in step S21), then the digital controller 25 generates the docking path PD such that the docking path PD does not include a waypoint WP between the current location LC of the watercraft 10 to the target location LT of the target dock DT (step S23).

Specifically, in step S23, the digital controller 25 generates the docking path PD such that the docking path PD includes a straight course or a smoothly curved course that extends from the current location LC of the watercraft 10 to the target location LT of the target dock DT.

Furthermore, in step S23, the digital controller 25 generates the docking path PD such that the heading of the watercraft 10 is gradually changed from the current heading HC of the watercraft 10 to the target heading HT of the watercraft 10 while traveling along the straight course or the smoothly curved course of the docking path PD.

In response to the digital controller 25 completing the generation of the docking path PD from the current location LC of the watercraft 10 to the target location LT of the target dock DT in step 23, the digital controller 25 engages the auto-docking control and the process proceeds to step S17 shown in FIG. 7.

Optionally, in the illustrated embodiment, when the digital controller 25 determines that the user selection of the target dock DT is received ("Yes" in step S15), the digital controller 25 can validate the target dock DT to determine if the target dock DT has sufficient area to accommodate the watercraft 10 before the process proceeds to step S16 for generating the docking path PD. In this case, the digital controller 25 can determine the area of the target dock DT based on the detection results of the detector 14, and compare the area of the target dock DT with the dimensions of the watercraft 10. If the digital controller 25 determines that the target dock DT has sufficient area to accommodate the watercraft 10, then the process proceeds to step S16 for generating the docking path PD. On the other hand, if the digital controller 25 determines that the target dock DT does not have sufficient area to accommodate the watercraft 10, then the digital controller 25 can output notification for the user to re-select the target dock DT. Furthermore, if the dock list 70 (FIG. 8) and/or the candidate dock list 76 (FIGS. 10A and 10B) include area information indicative of the dimensions of each dock in the dock list 70 and/or the candidate dock list 76, then the digital controller 25 can determine the area of the target dock DT based on the area information in the dock list 70 and/or the candidate dock list 76.

Figure 12:
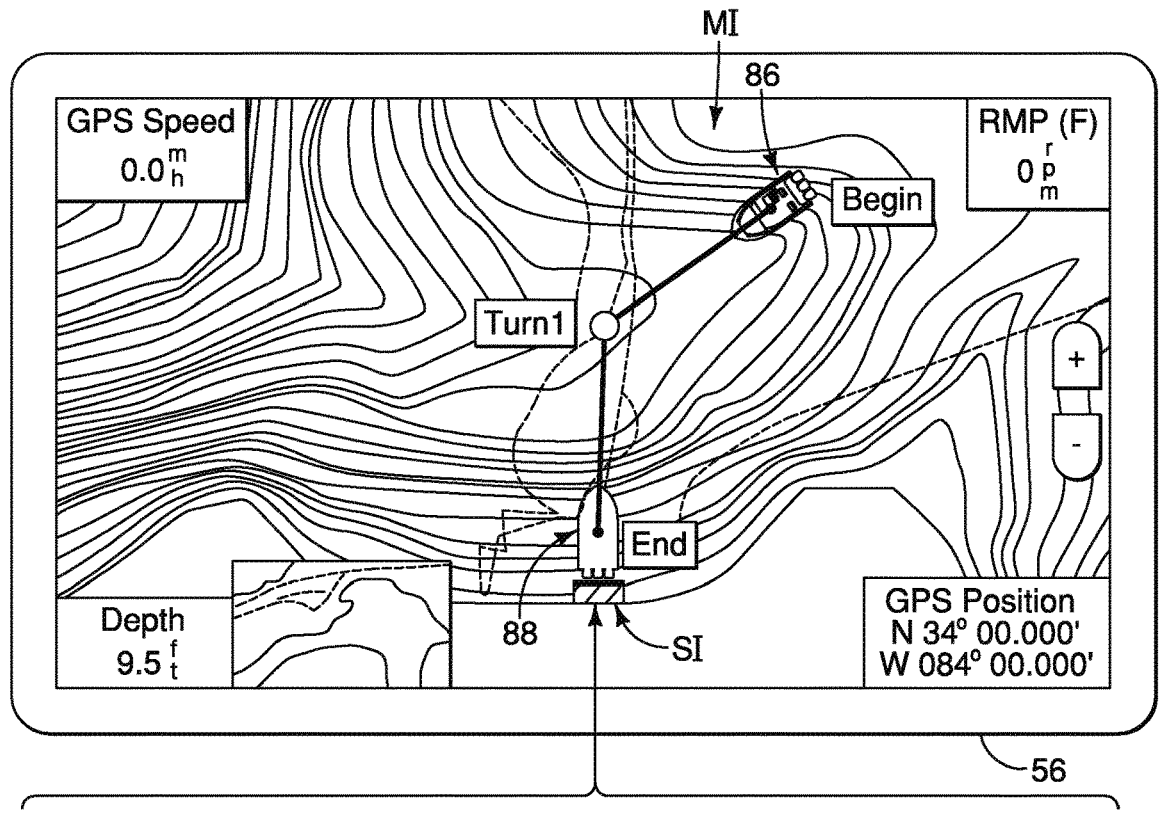
FIG. 12 is a screen shot of a navigation screen displayed on the touch screen display, illustrating the docking path being displayed on the navigation screen.
Figure 12:
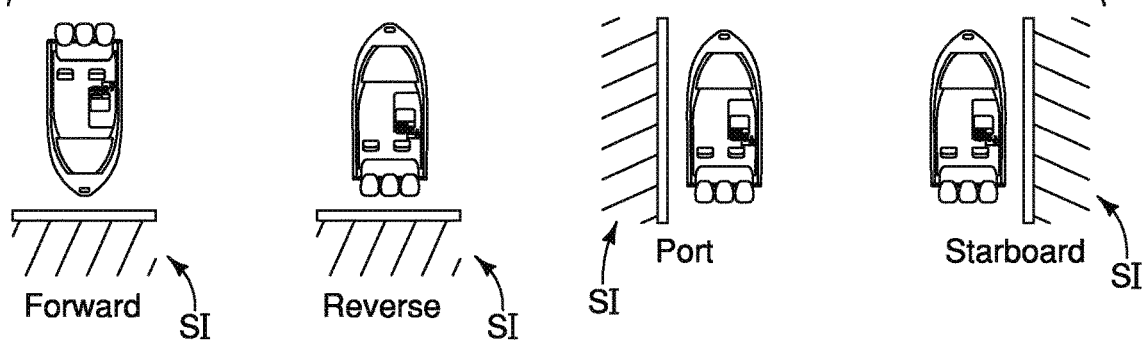

When the digital controller 25 engages the auto-docking control, the digital controller 25 graphically displays the docking path PD over a map image MI that is generated based on pre-stored map database of the satellite navigation system 52 and displayed on the touch screen display 56, as shown in FIG. 12. Specifically, the digital controller 25 graphically displays the current location LC of the watercraft 10 ("Begin"), the waypoint WP ("Turn 1") and the target location LT of the target dock DT ("End"). Furthermore, the digital controller 25 graphically displays a current watercraft image 86 and a target watercraft image 88 over the map image MI on the touch screen display 56. The current watercraft image 86 is indicative of the watercraft 10 that is located at the current location LC and is oriented toward the current heading HC. The target watercraft image 88 is indicative of the watercraft 10 that is located at the target location LT and is oriented toward the target heading HT.

Furthermore, as shown in FIG. 12, the digital controller 25 graphically displays a mooring structure image SI over the map image MI on the touch screen display 56. The mooring structure image SI is indicative of the mooring structure S next to the target dock DT. The mooring structure image SI is displayed at a position on the map image MI next to a position corresponding to the target dock DT. The mooring structure image SI is also displayed on the map image MI in an orientation according to the dock orientation of the target dock DT (i.e., the orientation information 74 of the target dock DT). Alternatively, when a docking direction of the watercraft 10 (i.e., "Forward," "Reverse," "Port," or "Starboard") is preset in the settings of the auto-docking mode, then the digital controller 25 can graphically displays the mooring structure image SI on the map image MI in an orientation according to the preset docking direction, as shown by examples illustrated in FIG. 12. Here, the docking direction of the watercraft 10 indicates a side of the watercraft 10 (i.e., "Forward," "Reverse," "Port," or "Starboard") that is brought alongside the mooring structure S when the watercraft 10 is located at the target dock DT.

Referring back to FIG. 7, in step S17, when the digital controller 25 engages the auto-docking control, the digital controller 25 autonomously navigates the watercraft 10 using the autopilot system along the docking path PD. In the illustrated embodiment, the main watercraft control system of the watercraft 10 or the central digital controller 24 serves as the autopilot system of the watercraft 10, and autonomously controls the propulsion direction and the propulsion force of the watercraft 10 such that the watercraft 10 is autonomously navigated along the docking path PD while maintaining a predetermined speed. In the illustrated embodiment, the predetermined speed is set to 1.3 meters/second (or 2.5 knots), for example. However, the predetermined speed is settable to any other suitable value as needed and/or desired. The autopilot control to follow a predetermined travel path, such as the docking path PD, can be executed by the autopilot system in a conventional manner, and thus will not be discussed in more detail.

However, when the docking path PD with the waypoint WP is generated in S22, as shown in FIGS. 1, 2A and 2B, the watercraft 10 is autonomously navigated to travel along the first straight course SC1 from the current location LC of the watercraft 10 to the waypoint WP at the predetermined speed while maintaining the current heading HC of the watercraft 10. When the watercraft 10 reaches the waypoint WP, the watercraft 10 is navigated to turn to align the target heading FIT of the watercraft 10. When the heading of the watercraft 10 is changed from the current heading HC of the watercraft 10 to the target heading HT of the watercraft 10 at the waypoint WP, the watercraft 10 is again autonomously navigated to travel along the second straight course SC2 from the waypoint WP to the target location LT of the target dock DT at the predetermined speed while maintaining the target heading HT of the watercraft 10.

While the auto-docking control is engaged, the digital controller 25 continuously receives the speed of the watercraft 10, the position of the watercraft 10, and the heading of the watercraft 10 based on detection results from various receivers, detectors and/or sensors. Specifically, the digital controller 25 determines whether the watercraft 10 reaches the target location LT of the target dock DT (step S18).

If the digital controller 25 determines that the watercraft 10 reaches the target location LT of the target dock DT ("Yes" in step S18), then the digital controller 25 disengages the auto-docking control, ends the operation of the watercraft 10 in the auto-docking mode, and switches the operation of the watercraft 10 from the auto-docking mode to the predetermined control mode (e.g., the user-specified mode) (step S19). As mentioned above, the predetermined control mode includes the stay point mode, the caterpillar mode, the joystick mode, the normal manual mode, etc. The predetermined control mode can be preset in advance.

In the illustrated embodiment, an example is shown in which the digital controller 25 displays each peripheral dock as a candidate dock in the candidate dock list 76 (see FIGS. 10A and 10B) on the touch screen display 56 (step S14 in FIG. 7) (i.e., a "list display mode"). However, the present invention is not limited to this. Alternatively, in step S14 in FIG. 7, the digital controller 25 can display each peripheral dock as a candidate dock in a different manner.

Figure 13:
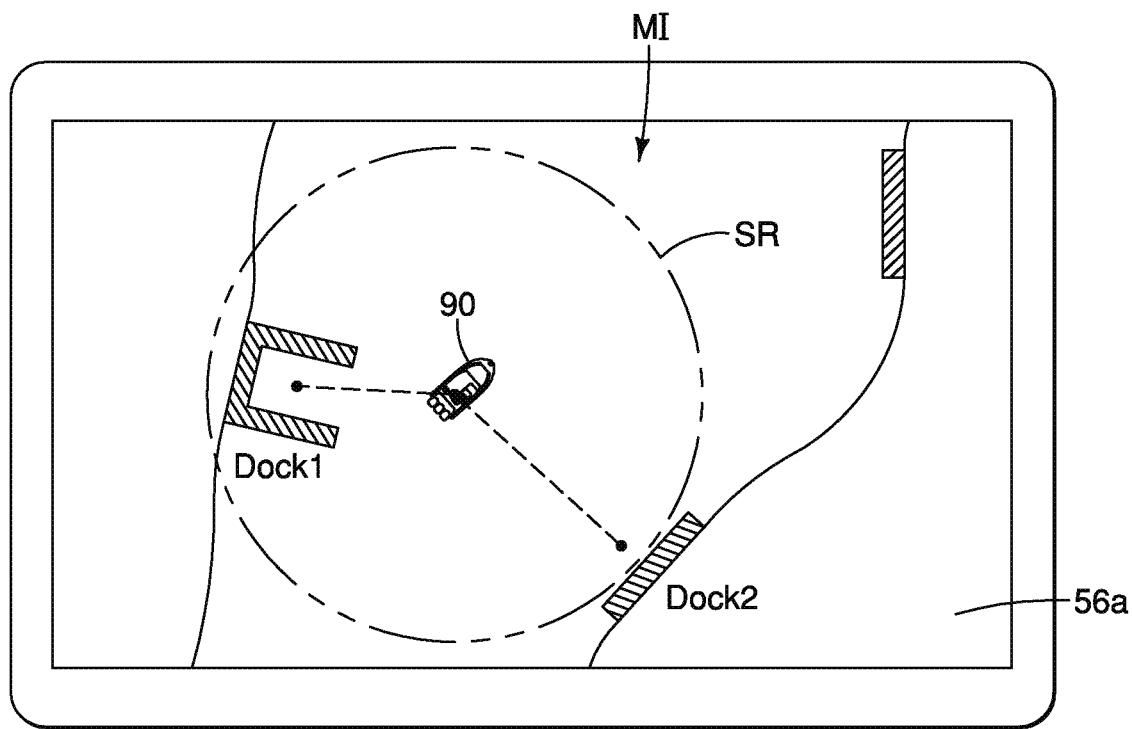
FIG. 13 is a screen shot of a map image displayed on the touch screen display, illustrating a situation in which peripheral docks are found within the search radius.

For example, if at least one peripheral dock that is located within the search radius is found from the dock list 70 ("Yes" in step S13 in FIG. 7), then the digital controller 25 can graphically display each peripheral dock as a candidate dock on a map image MI on the touch screen display 56, as shown in FIG. 13 (i.e., a "map display mode").

Specifically, as described above, the digital controller 25 can obtain the coordinate information 72 and the orientation information 74 of each peripheral dock from the dock list 70. Thus, the digital controller 25 can graphically indicate the location or name of each peripheral dock (i.e., "Dock 1" and "Dock 2") on the map image MI, as shown in FIG. 13. However, of course, the digital controller 25 can merely graphically display the map image MI of an area in which each peripheral dock is located, and does not need to graphically indicate the location or name of each peripheral dock on the map image MI. In either case, the digital controller 25 graphically displays each peripheral dock as a candidate dock on the map image MI on the touch screen display 56.

In this case, the map image MI can be generated based on pre-stored map database that is stored in the satellite navigation system 52, or be generated by the digital controller 25 based on the detection signals from the detector 14. Furthermore, optionally, the digital controller 25 can graphically display a current watercraft image 90 and a circle SR on the map image MI, as shown in FIG. 13. The current watercraft image 90 is indicative of the watercraft 10 that is located at the current location LC and is orientated toward the current heading HC, and the circle SR is indicative of the search radius of the predetermined distance.

Furthermore, in the case in which the digital controller 25 graphically displays each peripheral dock as a candidate dock on the map image MI on the touch screen display 56 (step S14), as shown in FIG. 13, the driver can further select the target dock DT on the map image MI using the touch screen display 56.

For example, as described above, the digital controller 25 can obtain the coordinate information 72 and the orientation information 74 of each peripheral dock from the dock list 70. Thus, if the driver touches a location of the touch screen 56a near one of the peripheral docks (e.g., "Dock 1"), then the digital controller 25 can determine that the one of the peripheral docks (e.g., "Dock 1") is selected as the target dock DT according to the touched location of the touch screen 56a. In this case, the digital controller 25 can also determine the target location LT and the target heading HT according to the coordinate information 72 and the orientation information 74 of the one of the peripheral docks (e.g., "Dock 1") in the dock list 70, and thus can generate the docking path PD based on the target location LT and the target heading HT in a manner explained above.

Alternatively, the digital controller 25 can select the target dock DT (or set the target location LT and the target heading HT) using a graphical user interface to generate the docking path PD. Referring now to FIGS. 14 to 18, an example of the user selection of the target dock DI using the graphical user interface will be explained.

Figure 14:
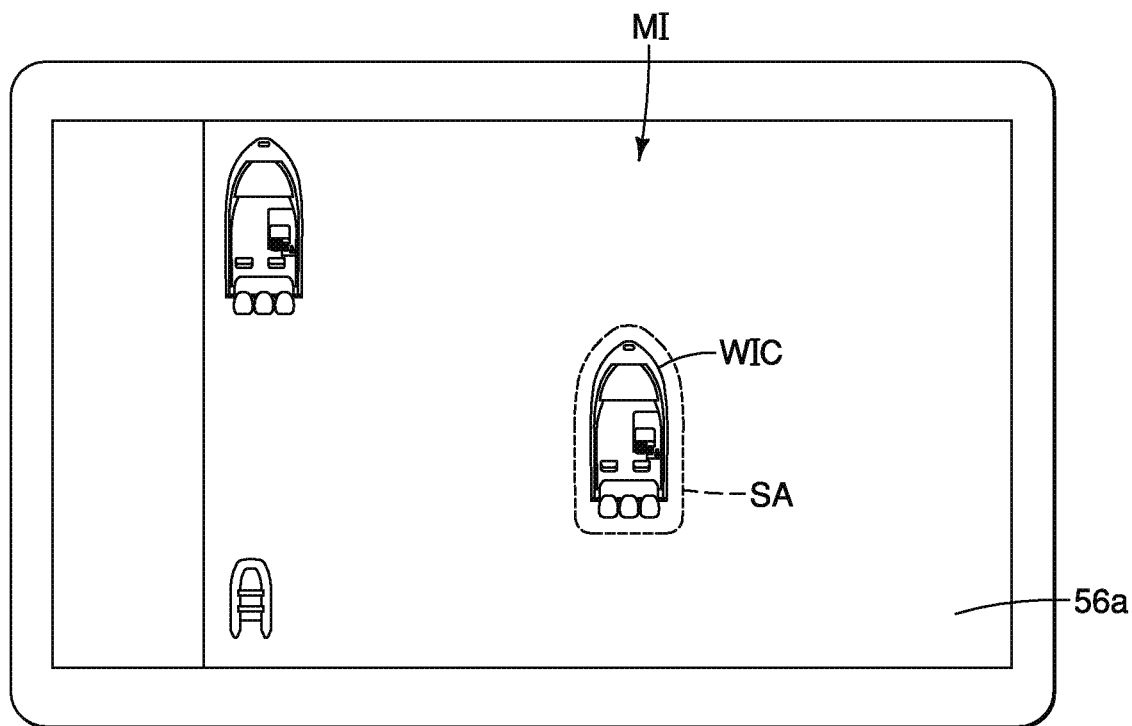
FIG. 14 is a screen shot of a map image displayed on the touch screen display, illustrating a current watercraft image being displayed over the map image for selecting a target dock using a graphical user interface.

As shown in FIG. 14, if at least one peripheral dock that is located within the search radius is found from the dock list 70 ("Yes" in step S13 in FIG. 7), then the digital controller 25 can graphically display the map image MI on the touch screen display 56 (step S14 in FIG. 7). FIG. 14 illustrates the map image MI that is generated based on the detection signals from the detector 14, for example. Thus, as shown in FIG. 14, the map image MI can show images indicative of other watercrafts or obstacles other than the watercraft 10. However, as described above, the map image MI can be generated based on pre-stored map database of the satellite navigation system 52.

As also shown in FIG. 14, the digital controller 25 generates a current watercraft image WIC (e.g., a first image or icon) indicative of the watercraft 10 that is located at the current location LT, and graphically displays the current watercraft image WIC over the map image MI.

Figure 15:
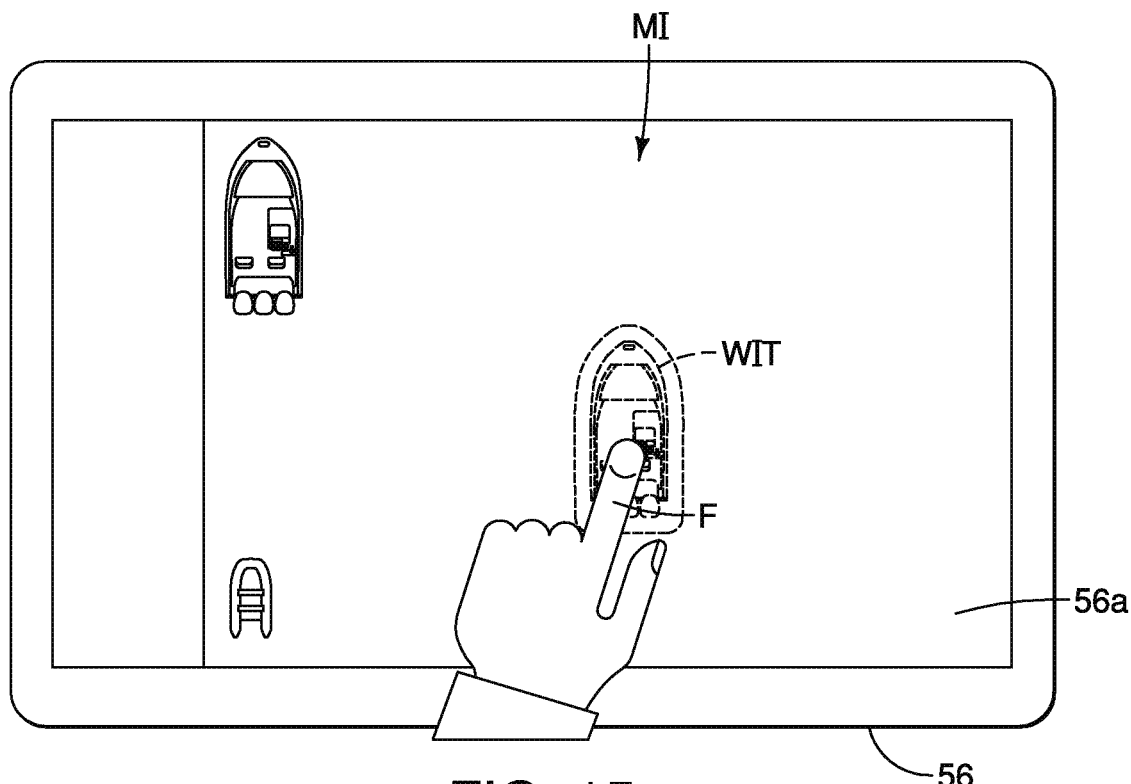
FIG. 15 is a screen shot of the map image displayed on the touch screen display, illustrating a user manually selecting the current watercraft image using a graphical user interface to display a target watercraft image.

As shown in FIG. 15, if the digital controller 25 receives a user input selecting the current watercraft image WIC on the map image MI using the touch screen display 56, then the digital controller 25 generates a target watercraft image WIT (e.g., a second image or icon) and graphically displays the target watercraft image WIT on the touch screen display 56. Specifically, the digital controller 25 receives the user input selecting the current watercraft image WIC when the user touches a location of the touch screen 56a within a surrounding area SA that surrounds the current watercraft image WIC using a user's finger F or other indicators, for example. In the illustrated embodiment, the digital controller 25 graphically displays the target watercraft image WIT over the current watercraft image WIC, as shown in FIG. 15, or at a location corresponding to the touched location of the touch screen 56a.

As shown in FIG. 15, the target watercraft image WIT is indicative of the watercraft 10 and is a different image from the current watercraft image WIC, as indicated by the dashed lines in FIG. 15. Specifically, the target watercraft image WIT can be the so-called "shadow" image of the current watercraft image WIT that has the same outlines with different color, contrast, etc. However, of course, the target watercraft image WIT can be the same image as the current watercraft image WIC, as needed and/or desired.

Figure 16:
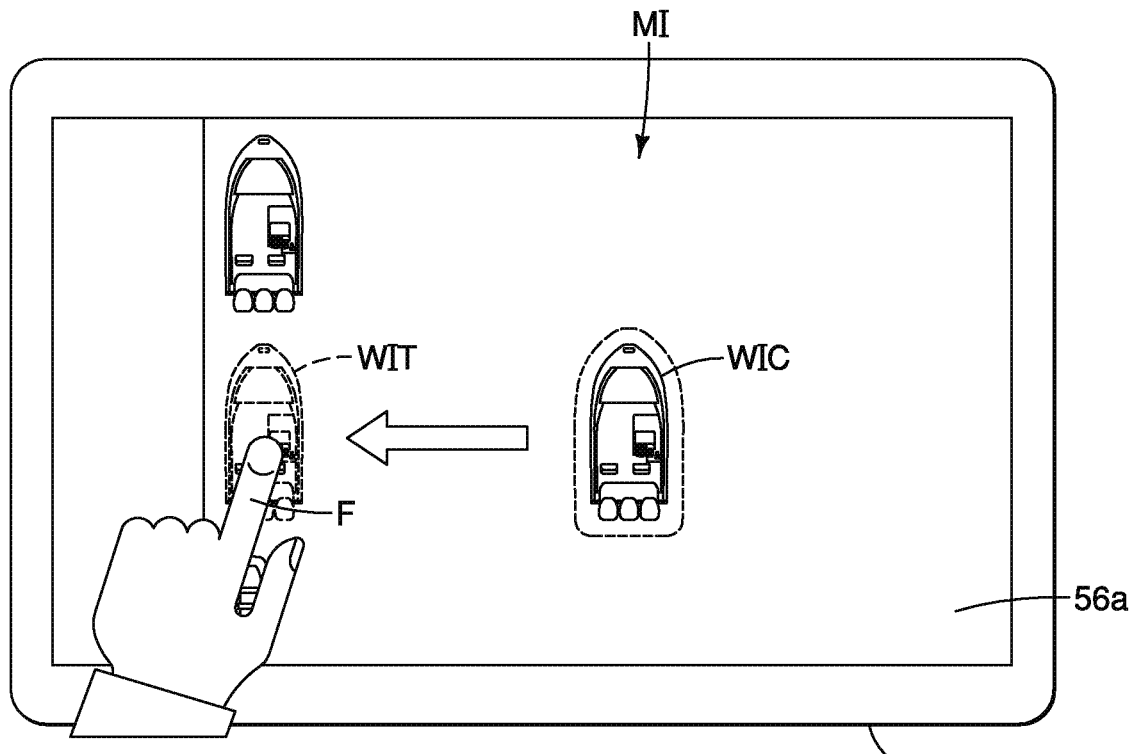
FIG. 16 is a screen shot of the map image displayed on the touch screen display, illustrating the user selecting the target dock by dragging the target watercraft image to the target dock using a graphical user interface.

As shown in FIG. 16, if the digital controller 25 receives a user input moving the user's finger F over the touch screen 56a without losing contact, then the digital controller 25 graphically displays the target watercraft image WIT such that the target watercraft image WIT moves to follow the movement of the user's finger F over the touch screen 56a. Thus, the target watercraft image WIT can be dragged to a desired location on the map image MI according to the movement of the user's finger F over the touch screen 56a.

Figure 17:
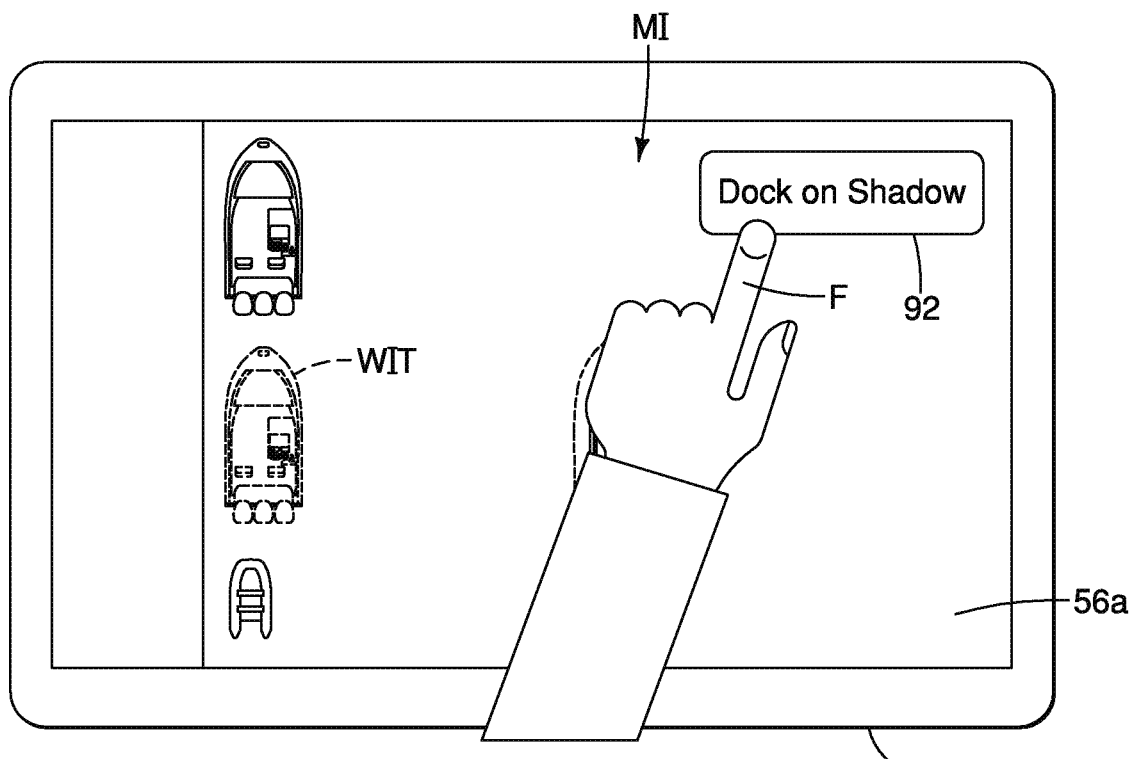
FIG. 17 is a screen shot of the map image displayed on the touch screen display, illustrating the user confirming a selection of the target dock using a graphical user interface.

As shown in FIG. 17, if the digital controller 25 receives a user input lifting the user's finger F from the touch screen 56a, then the digital controller 25 graphically displays a confirmation button 92 ("Dock on Shadow") for confirming the location of the target watercraft image WIT on the map image MI. If the digital controller 25 receives a user selection selecting the confirmation button 92 on the map image MI using the touch screen display 56, then the digital controller 25 determines that the user selection of the target dock DT is received ("Yes" in step S15) and the process proceeds to step S16. Thus, in the illustrated embodiment, the digital controller 25 receive the user selection of the target dock DT based on the movement of the target watercraft image WIT to the target location LT of the target dock DT on the map image MI.

In step S16, the digital controller 25 generates the docking path PD using the location of the target watercraft image WIT on the map image MI as the target location LT of the target dock DT and the orientation of the target watercraft image WIT on the map image MI as the target heading HT of the watercraft 10 at the target dock DT.

Figure 18:
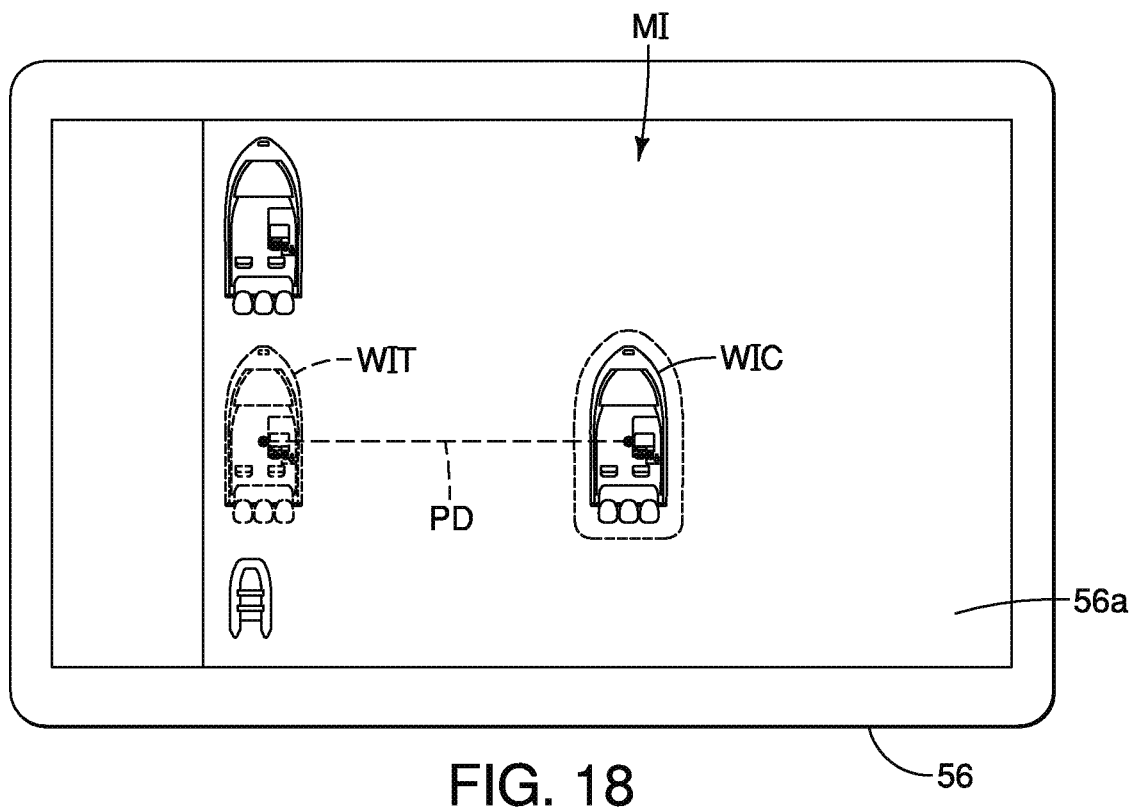
FIG. 18 is a screen shot of the map image displayed on the touch screen display, illustrating a docking path being generated without a waypoint and being displayed on the map image.

As shown in FIG. 18, if the digital controller 25 completes the generation of the docking path PD, then the digital controller 25 can graphically display the docking path PD on the map image MI. In this case, the digital controller 25 can also graphically simulate the navigation of the watercraft 10 by moving the current watercraft image WIC along the docking path PD so as to overlap the target watercraft image WIT on the touch screen display 56. Here, FIG. 18 illustrates a case in which the digital controller 25 generates the docking path PD such that the docking path PD does not include a waypoint WP (see step S23 in FIG. 11, for example).

Optionally, in the illustrated embodiment, when the digital controller 25 determines that the user selection of the target dock DT is received ("Yes" in step S15 in FIG. 7), the digital controller 25 can validate the target dock DT to determine if the target dock DT has sufficient area to accommodate the watercraft 10 before the process proceeds to step S16 for generating the docking path PD. In this case, the digital controller 25 can determine the area of the target dock DT based on the detection results of the detector 14, and compare the area of the target dock DT with the dimensions of the watercraft 10. If the digital controller 25 determines that the target dock DT has sufficient area to accommodate the watercraft 10, then the process proceeds to step S16 for generating the docking path PD. On the other hand, if the digital controller 25 determines that the target dock DT does not have sufficient area to accommodate the watercraft 10, then the digital controller 25 can output notification for the user to re-select the target dock DT.

Furthermore, optionally, in the illustrated embodiment, the digital controller 25 can limit the movement of the target watercraft image WIT on the map image MI within an area according to the search radius. For example, if the digital controller 25 receives a user input lifting the user's finger F from the touch screen 56a at a location outside the search radius, then the digital controller 25 can output notification for the user to re-select the target dock DT without graphically displaying the confirmation button 92 ("Dock on Shadow") for confirming the location of the target watercraft image WIT on the map image MI.

Referring further to FIGS. 19-24, another example of the user selection of the target dock DT using the graphical user interface will be explained. In this example, the digital controller 25 receives a user input indicating the target heading HT of the watercraft 10 using the graphical user interface.

Figure 19:
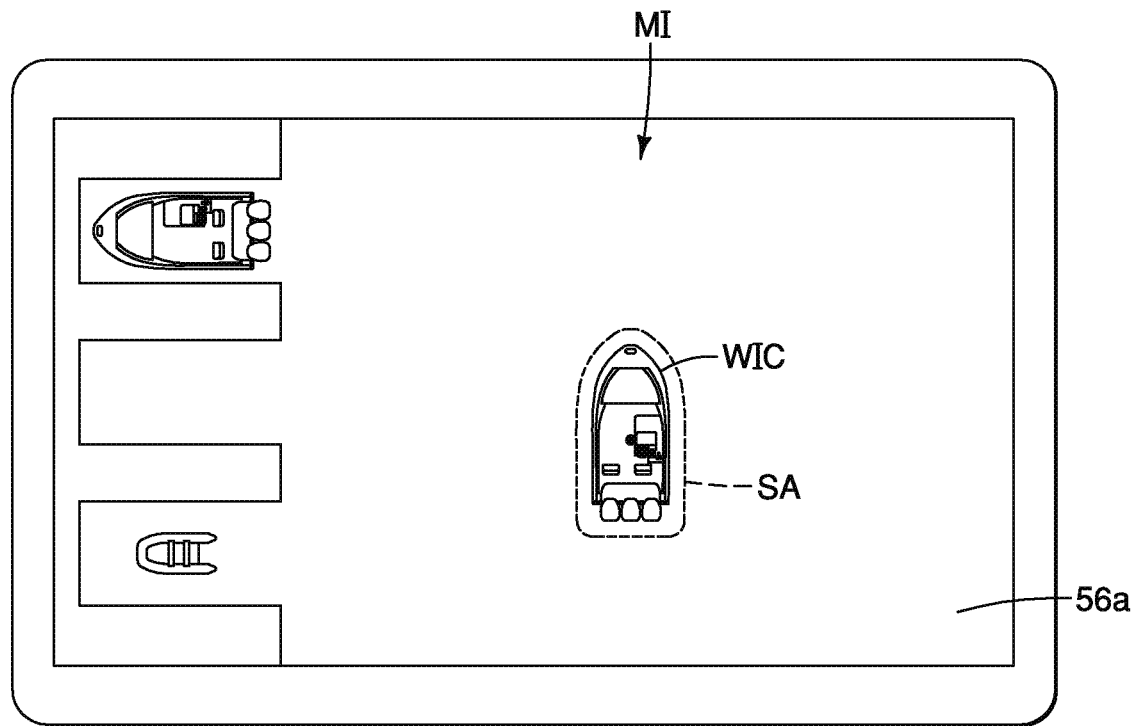
FIG. 19 is a screen shot of a map image displayed on the touch screen display, illustrating a current watercraft image being displayed over the map image for selecting a target dock using a graphical user interface.

As shown in FIG. 19, if at least one peripheral dock that is located within the search radius is found from the dock list 70 ("Yes" in step S13 in FIG. 7), then the digital controller 25 can graphically display the map image MI on the touch screen display 56 (step S14 in FIG. 7).

As also shown in FIG. 19, the digital controller 25 generates the current watercraft image WIC indicative of the watercraft 10 that is located at the current location LT, and graphically displays the current watercraft image WIC over the map image MI.

Figure 20:
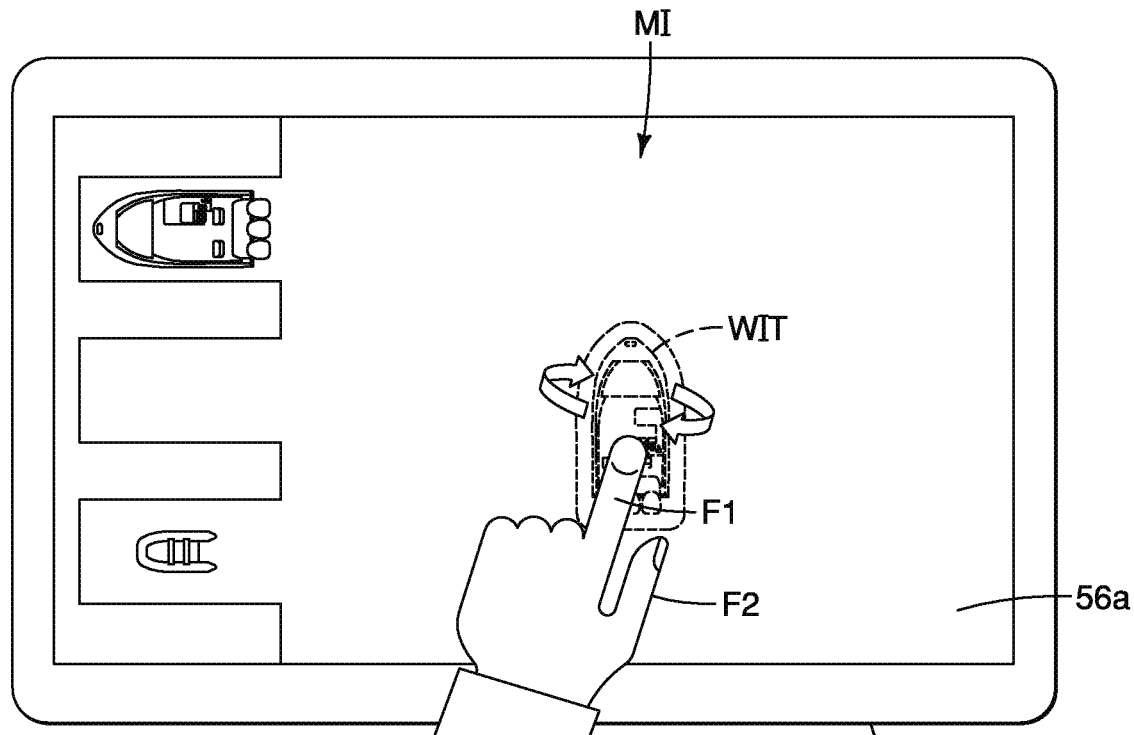
FIG. 20 is a screen shot of the map image displayed on the touch screen display, illustrating a user selecting the current watercraft image using a graphical user interface to display a target watercraft image.

As shown in FIG. 20, if the digital controller 25 receives the user input selecting the current watercraft image WIC on the map image MI using the touch screen display 56, then the digital controller 25 generates the target watercraft image WIT and graphically displays the target watercraft image WIT on the touch screen display 56. Specifically, the digital controller 25 receives the user input selecting the current watercraft image WIC when the user touches a location of the touch screen 56a within the surrounding area SA using a first user's finger F1 or other indicators, for example. In the illustrated embodiment, the digital controller 25 graphically displays the target watercraft image WIT over the current watercraft image WIC, as shown in FIG. 20, or at a location corresponding to the touched location of the first user's finger F1 on the touch screen 56a.

Figure 21:
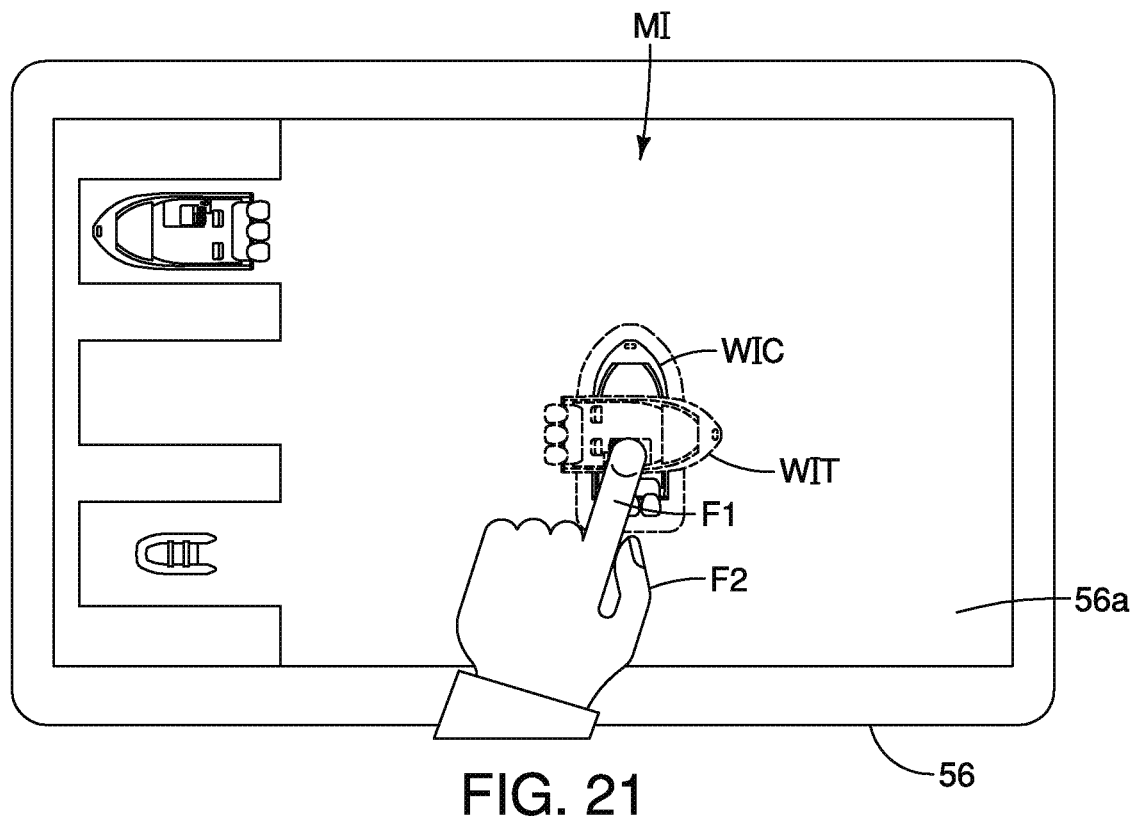
FIG. 21 is a screen shot of the map image displayed on the touch screen display, illustrating the user setting a target heading of the watercraft by rotating the target watercraft image to the target heading using a graphical user interface.

As shown in FIGS. 20 and 21, if the digital controller 25 receives a user input touching the touch screen 56a using a second user's finger F2 or other indicators and moving the second user's finger F2 relative to the first finger F1 without losing contact, then the digital controller 25 graphically displays the target watercraft image WIT such that the target watercraft image WIT rotates according to the relative position of the touched locations of the first and second user's fingers F1 and F2 on the touch screen 56a. Thus, the target watercraft image WIT can be rotated to a desired orientation on the map image MI according to the relative movement of the first and second user's fingers F1 and F2 over the touch screen 56a.

If the digital controller 25 receives a user input lifting the second user's finger F2 from the touch screen 56a after the target watercraft image WIT is rotated to the desired orientation, then the digital controller 25 graphically displays the target watercraft image WIT such that the orientation of the target watercraft image WIT is maintained in the desired orientation.

Figure 22:
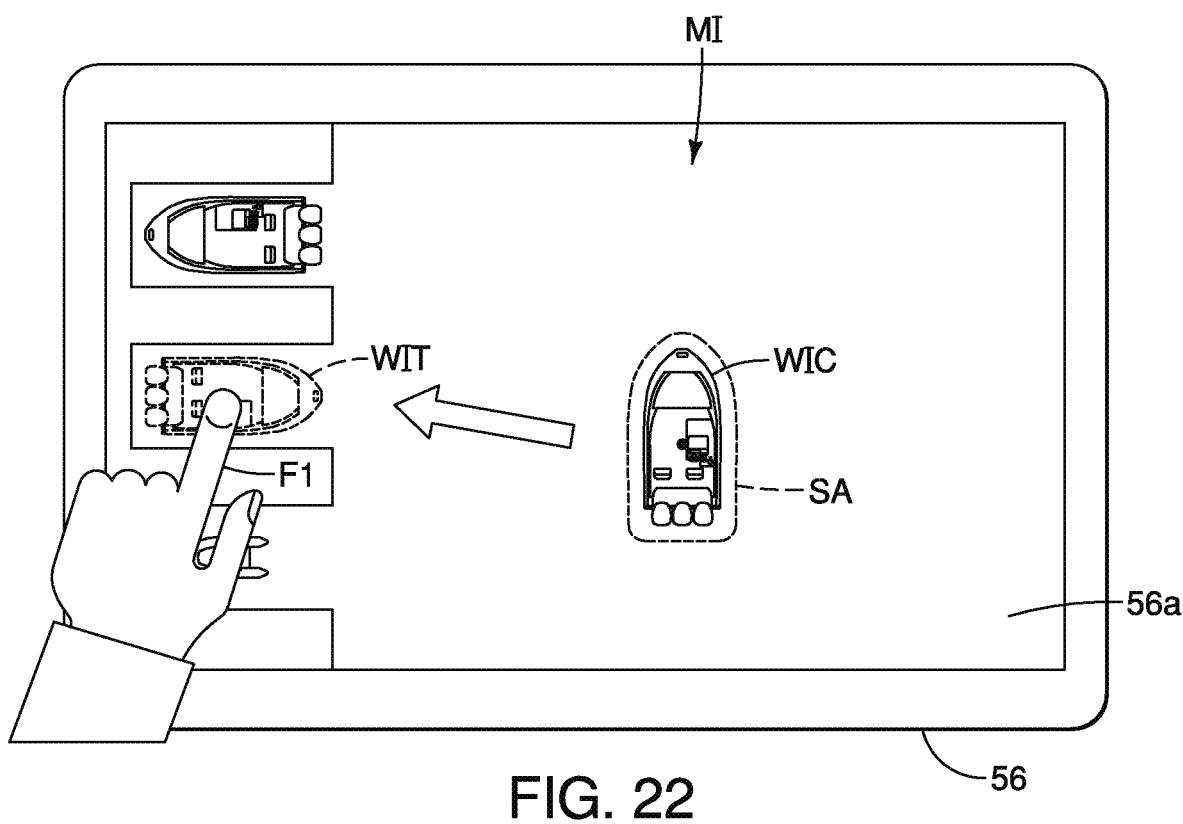
FIG. 22 is a screen shot of the map image displayed on the touch screen display, illustrating the user selecting the target dock by dragging the target watercraft image to the target dock using a graphical user interface.

As shown in FIG. 22, if the digital controller 25 receives a user input moving the first user's finger F1 over the touch screen 56a without losing contact, then the digital controller 25 graphically displays the target watercraft image WIT such that the target watercraft image WIT that has been oriented in the desired orientation moves to follow the movement of the first user's finger F1 over the touch screen 56a. Thus, the target watercraft image WIT can be dragged to a desired location on the map image MI according to the movement of the first user's finger F1 over the touch screen 56a.

Figure 23:
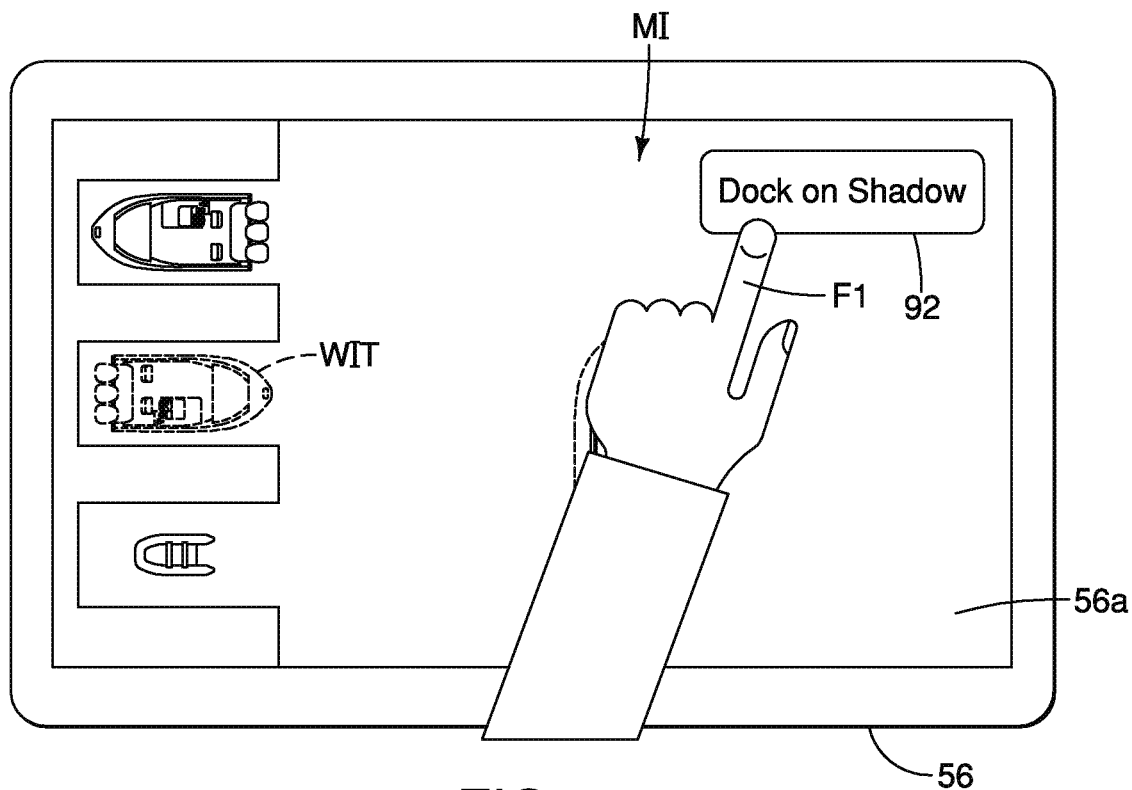
FIG. 23 is a screen shot of the map image displayed on the touch screen display, illustrating the user confirming a selection of the target dock using a graphical user interface.

As shown in FIG. 23, if the digital controller 25 receives a user input lifting the first user's finger F1 from the touch screen 56a, then the digital controller 25 graphically displays the confirmation button 92 ("Dock on Shadow") for confirming the location of the target watercraft image WIT on the map image MI. If the digital controller 25 receives a user selection selecting the confirmation button 92 on the map image MI using the touch screen display 56, then the digital controller 25 determines that the user selection of the target dock DT is received ("Yes" in step S15) and the process proceeds to step S16.

Specifically, in step S16, the digital controller 25 generates the docking path PD using the location of the target watercraft image WIT on the map image MI as the target location LT of the target dock DT and the orientation of the target watercraft image WIT on the map image MI as the target heading HT of the watercraft 10 at the target dock DT.

Figure 24:
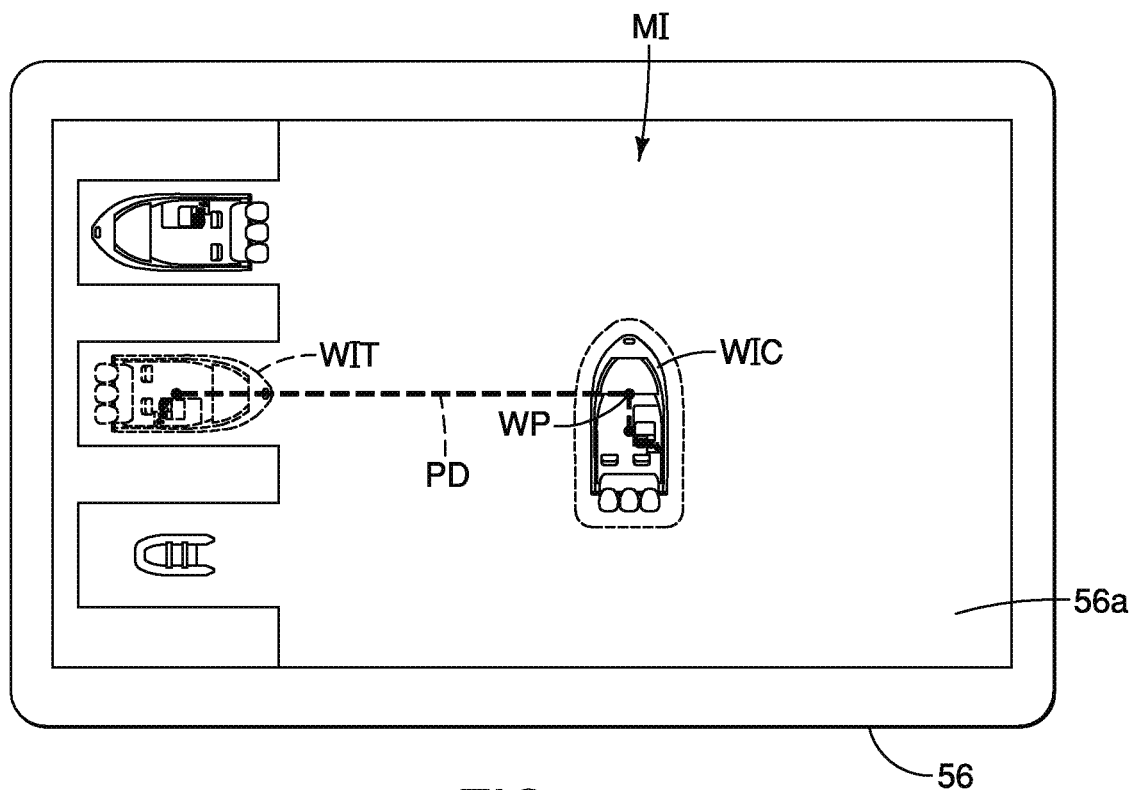
FIG. 24 is a screen shot of the map image displayed on the touch screen display, illustrating a docking path being generated with a waypoint and being displayed on the map image.
Figure 25:
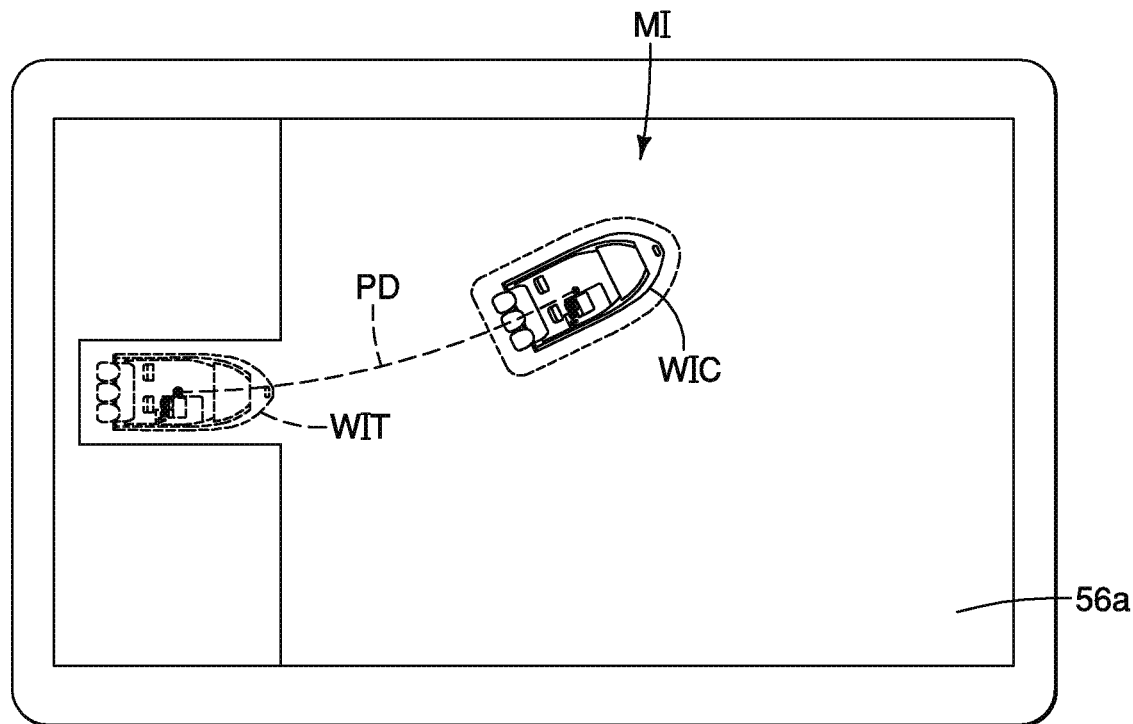
FIG. 25 is a screen shot of a map image displayed on the touch screen display, illustrating a docking path formed by a smooth curve course being generated without a waypoint and being displayed on the map image.

As shown in FIG. 24, if the digital controller 25 completes the generation of the docking path PD, then the digital controller 25 can graphically display the docking path PD on the map image MI. In this case, the digital controller 25 can also graphically simulate the navigation of the watercraft 10 by moving the current watercraft image WIC along the docking path PD so as to overlap the target watercraft image WIT on the touch screen display 56. Here, FIG. 24 illustrates a case in which the digital controller 25 generates the docking path PD such that the docking path PD include a waypoint WP (see step S22 in FIG. 11, for example). However, of course, even in the example in which digital controller 25 receives the user input indicating the target heading HT of the watercraft 10 using the graphical user interface, the digital controller 25 can also generate the docking path PD such that the docking path PD does not include a waypoint WP (see step S23 in FIG. 11, for example), as shown in FIG. 25. Specifically, as shown in FIG. 25, the digital controller 25 can generate the docking path PD such that the docking path PD includes a smoothly curved course that extends from the current location LC of the watercraft 10 to the target location LT of the target dock DT and the heading of the watercraft 10 is gradually changed from the current heading HC of the watercraft 10 to the target heading HT of the watercraft 10 while traveling along the smoothly curved course of the docking path PD.

In the illustrated embodiment, examples are shown in which if at least one peripheral dock that is located within the search radius is found from the dock list 70 ("Yes" in step S13 in FIG. 7), then the digital controller 25 displays each peripheral dock as a candidate dock in the candidate dock list 76, as shown in FIGS. 10A and 10 (i.e., the "list display mode") or the digital controller 25 graphically displays each peripheral dock as a candidate dock on the map image MI, as shown in FIGS. 13 to 25 (i.e., the "map display mode") (step S14 in FIG. 7). However, the present invention is not limited to this. Specifically, in step S14 in FIG. 7, the digital controller 25 can be configured to switch the display mode between the "list display mode" and the "map display mode" according to the user's setting of the auto-docking mode, as shown in FIG. 26.

Figure 26:
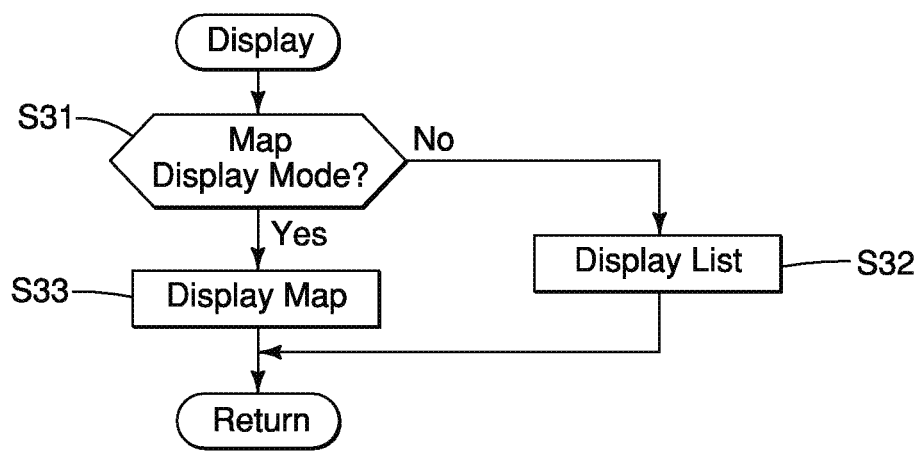
FIG. 26 is a flow chart of a peripheral dock display process of the auto-docking mode executed by the watercraft control system.

Specifically, as shown in FIG. 26, if at least one peripheral dock that is located within the search radius is found from the dock list 70 ("Yes" in step S13 in FIG. 7), then the digital controller 25 determines whether the "map display mode" is preset in the user's setting of the auto-docking mode (step S31). If the digital controller 25 determines that the "map display mode" is not preset in the user's setting of the auto-docking mode ("No" in step S31), then the digital controller 25 displays each peripheral dock as a candidate dock in the "list display mode" shown in FIGS. 10A and 10B (step S32) and the process proceeds to step S15 in FIG. 7. On the other hand, if the digital controller 25 determines that the "map display mode" is preset in the user's setting of the auto-docking mode ("Yes" in step S31), then the digital controller 25 graphically displays each peripheral dock as a candidate dock in the "map display mode" shown in FIGS. 13 to 25 (step S33) and the process proceeds to step S15 in FIG. 7.

In the illustrated embodiment, an example is shown in which the digital controller 25 searches the peripheral docks that are located within the search radius from the current location LC of the watercraft 10 in the dock list 70 (step S12 in FIG. 7). However, the present invention is not limited to this. For example, the digital controller 25 does not need to be provided with the dock list 70 that are pre-stored in advance. In this case, when the auto-docking mode is activated in step S11, the process can skip steps S12 and 13 and directly proceed to step S14. In this case, in step S14, the digital controller 25 can display the peripheral docks in the "map display mode". Then, the digital controller 25 can select the target dock DT according to a user selection of a location of the target dock DT on the map image MI or set the target location LT and the target heading HT according to a user input using the graphical user interface shown in FIGS. 14 to 25.

In the illustrated embodiment, an example is shown in which the digital controller 25 searches the peripheral docks that are located within the search radius from the current location LC of the watercraft 10 in the dock list 70 (step S12 in FIG. 7) and displays the peripheral docks on the touch screen display 56 (step S14). However, the present invention is not limited to this. For example, the digital controller 25 does not need to search the peripheral docks and display the peripheral docks on the touch screen display 56. In this case, when the auto-docking mode is activated in step S11, the process can skip steps S12 to 15 and the digital controller 25 displays an engine menu including a setting item for the auto-docking mode for manually selecting the target dock DT (or for manually setting the target location LT and the target heading HT).

Figure 27:
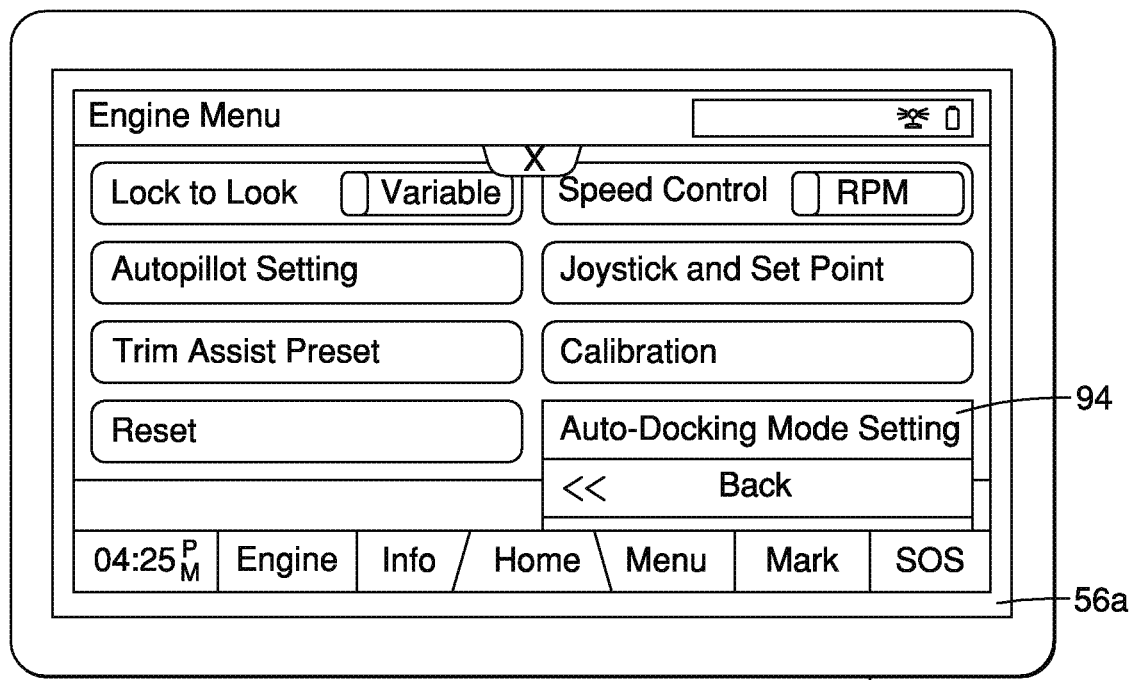
FIG. 27 is a screen shot of an engine menu screen displayed on e touch screen display, illustrating a button for configuring the auto-docking mode.
Figure 28:
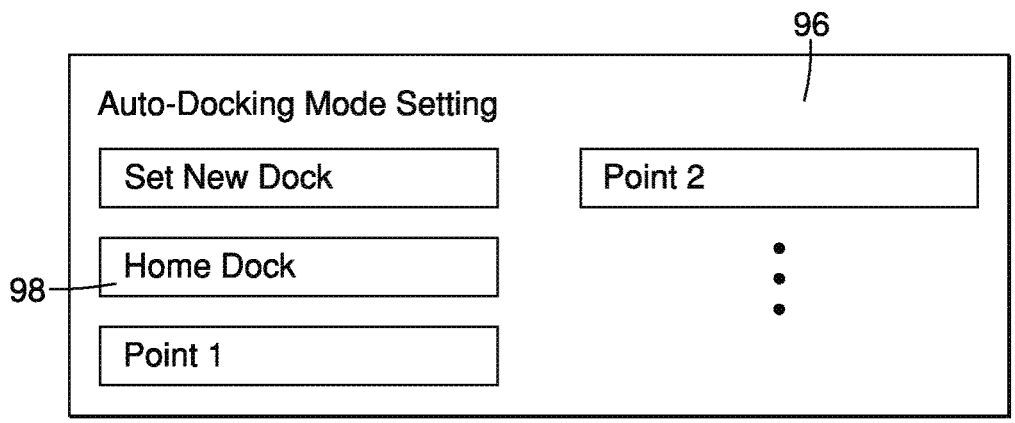
FIG. 28 is a screen shot of an auto-docking mode setting window displayed on the touch screen display, illustrating buttons for configuring settings of the auto-docking mode for various docks.

Referring now to FIGS. 27 to 31, this manual selection of the target dock DT will be described in detail. As mentioned above, in this case, when the auto-docking mode is activated in step S11, then the digital controller 25 displays the engine menu as shown in FIG. 27 on the touch screen display 56. As shown in FIG. 27, the engine menu includes a button 94 for setting the auto-docking mode ("Auto-Docking Mode Setting"). When the digital controller 25 receives a user input selecting the button 94, then the digital controller 25 displays a window 96 with buttons corresponding to candidate docks of the target dock DT, as shown in FIG. 28.

If the user wants to set a "Home Dock" as the target dock DT, then the user selects a button 98 corresponding to the "Home Dock" on the touch screen display 56 by double-tapping or other touch gesture, for example. In response, the digital controller 25 receives the user selection selecting the "Home Dock" as the target dock DT and determines the target location LT and the target heading HT at the target dock DT for generating the docking path PD based on the pre-stored setting for the "Home Dock". Then, the process proceeds to step S16 to generate the docking path PD based on the target location LT and the target heading HT that have been determined.

If the user wants to change the pre-stored setting for the "Home Dock" or initially configure the setting for the "Home Dock", then the user selects the button 98 displayed on the touch screen display 56 by single-tapping or other touch gesture, for example. In response, the digital controller 25 receives a user input selecting the "Home Dock" for configuration and displays a window 100 with buttons corresponding to setting items of the "Home Dock" as shown in FIG. 29.

Figure 29:
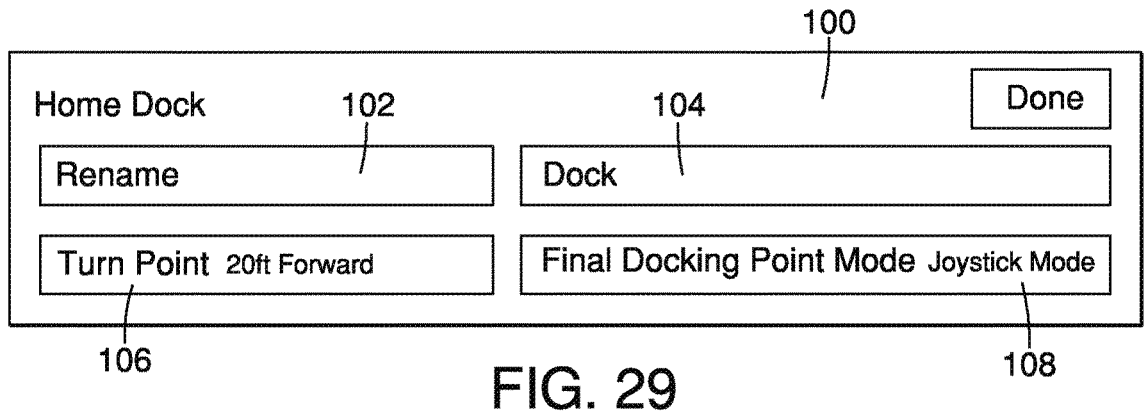
FIG. 29 is a screen shot of a home dock setting window displayed on the touch screen display, illustrating buttons for configuring settings of a home dock.

As shown in FIG. 29, the setting items of the "Home Dock" include "Rename", "Dock", "Turn Point" and "Final Docking Point Mode". If the user wants to change the name of the "Home Dock" or initially set the name of the "Home Dock", then the user selects the button 102 on the touch screen display 56 by single-tapping or other touch gesture to change the name of the "Home Dock". After the name of the "Home Dock" is changed by the user, the digital controller 25 stores the new name of the "Home Dock" in the memory 25a.

As also shown in FIG. 29, if the user wants to change or set the dock location and/or the dock orientation of the "Home Dock", then the user selects the button 104 on the touch screen display 56 by single-tapping or other touch gesture to change the dock location and/or the dock orientation of the "Home Dock". Here, the user can manually input the dock location (i.e., the coordinate information 72) and/or the dock orientation the orientation information 74). After the dock location and/or the dock orientation is changed by the user, the digital controller 25 stores the new dock location and/or the new dock orientation of the "Home Dock" in the memory 25a.

Here, in the illustrated embodiment, an example is shown in which the dock location and/or the dock orientation of the "Home Dock" is manually input through the window 100 shown in FIG. 29 after activating the auto-docking mode. However, the present invention is not limited to this. For example, the dock location and/or the dock orientation of the "Home Dock" can be preset in advance before activating the auto-docking mode. Specifically, the dock location and/or the dock orientation of the "Home Dock" can be preset by navigating the watercraft 10 to the "Home Dock" and setting the location and/or the orientation of the watercraft 10 at the "Home Dock" as the dock location and/or the dock orientation of the "Home Dock". In particular, the location and/or the orientation of the watercraft 10 at the "Home Dock" can be set as the dock location and/or the dock orientation of the "Home Dock" in response to the digital controller 25 receives a predetermined user input, such as pressing a predetermined button for a predetermined time period, etc.

Figure 30:
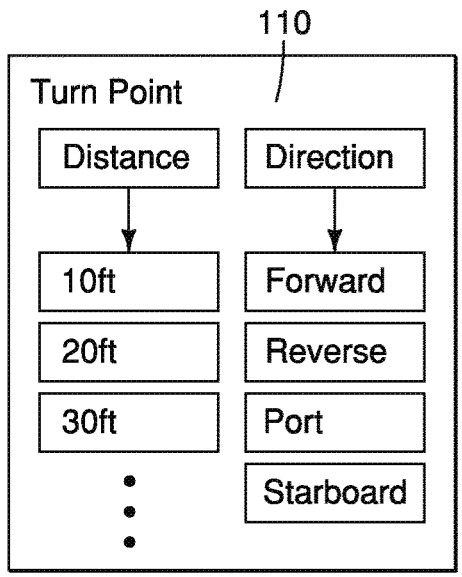
FIG. 30 is a screen shot of a turn point setting window displayed on the touch screen display, illustrating buttons for configuring settings of a turn point.

As also shown in FIG. 29, if the user wants to change the distance from the dock location of the "Home Dock" to the waypoint WP on the docking path PD and/or the docking direction of the watercraft 10 from the current setting "20 ft Forward" that is displayed on the button 106, then the user selects the button 106 on the touch screen display 56 by single-tapping or other touch gesture to change or set the distance and/or the docking direction. Here, the docking direction of the watercraft 10 indicates the side of the watercraft 10 ("Forward", "Reverse", "Port" and "Starboard") that is brought alongside the mooring structure S of the "Home Dock" when the watercraft 10 is located at the "Home Dock". In response, the digital controller 25 receives a user input selecting the button 106 and displays a window 110 with buttons for setting the distance and/or the docking direction, as shown in FIG. 30. After the distance and/or the docking direction is changed by the user on the window 110, the digital controller 25 stores the new settings of the distance and/or the docking direction in the memory 25a and displays the new settings on the button 106 of the window 100, as shown in FIG. 29.

Figure 31:
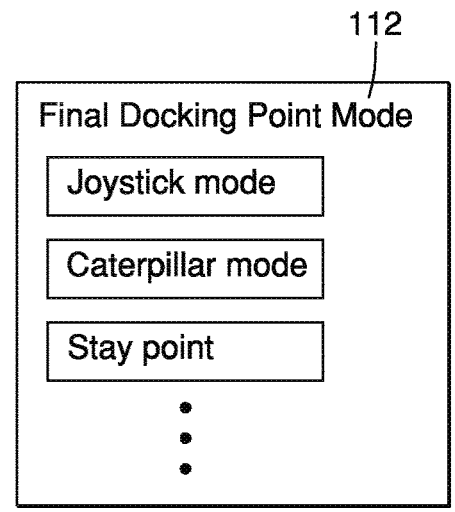
FIG. 31 is a screen shot of a final docking mode setting window displayed on the touch screen display, illustrating buttons for selecting a final docking mode after completing the auto-docking mode.

As also shown in FIG. 29, if the user wants to change the predetermined control mode from the current setting "Joystick Mode" that is displayed on the button 108, then the user selects the button 108 of the window 100 on the touch screen display 56 by single-tapping or other touch gesture to change or set the predetermined control mode. Here, the predetermined control mode is a control mode to which the operation of the watercraft 10 is switched from the auto-docking mode (step S19 in FIG. 7) after the watercraft 10 reaches the target location LT and the digital controller 25 ends the operation of the watercraft 10 in the auto-docking mode. In response, the digital controller 25 receives a user input selecting the button 108 and displays a window 112 with buttons for setting the predetermined control mode, as shown in FIG. 31. After the predetermined control mode is changed by the user on the window 112, the digital controller 25 stores the new settings of the predetermined control mode in the memory 25a and displays the new settings on the button 108 of the window 100, as shown in FIG. 29.

In the illustrated embodiment, as shown in FIG. 14, if at least one peripheral dock is found ("Yes" in step S13 in FIG. 7), then the digital controller 25 can graphically display the map image MI on the display screen or touch screen of the touch screen display 56 (step S14 in FIG. 7). In this case, as further shown in FIG. 32, the digital controller 25 can further graphically display the map image MI with at least one selectable dock DS on the touch screen display 56 for selection of the target dock DT.

Figure 33:
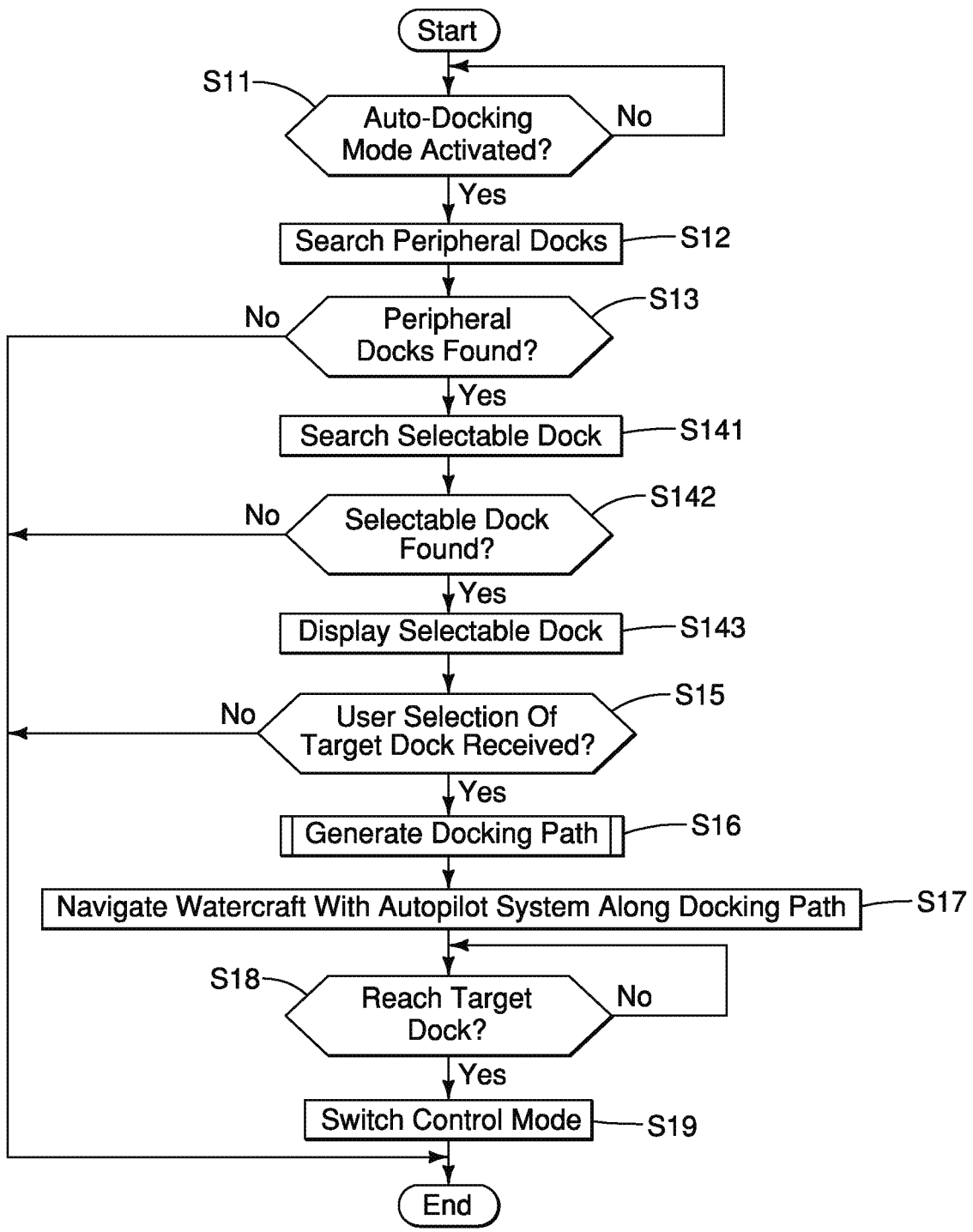
FIG. 33 is a flow chart of the auto-docking mode executed by the watercraft control system.

More specifically, as seen in FIG. 33, the digital controller 25 searches peripheral docks that are located around the watercraft 10 (step S12). In the illustrated embodiment, the digital controller 25 searches or determines the peripheral docks that are located around the watercraft 10 based on the detection results of the detector 14. In particular, the digital controller 25 recognizes spacings or areas of water (i.e., water surface areas WSA) between or next to one or a group of mooring structures S and/or between or next to one or a group of stationary or anchored objects O, such as other watercrafts, based on the detection results of the detector 14. In other words, the digital controller 25 recognizes water surface areas WSA where no object is detected therein by the detector 14 Then, the digital controller 25 determines the water surface areas WSA as the peripheral docks, respectively. Here, the recognition of the water surface areas WSA can be performed by a pattern recognition relative to the point cloud or the camera image overlaid onto the point cloud obtained by the detection results of the detector 14, or any other conventional methods well known in the art. In particular, the digital controller 25 can recognize the mooring structures S and the stationary or anchored objects O based on the detection results of the detector 14, and can determine the water surface areas WSA between or next to the mooring structures S and/or between or next to the stationary or anchored objects O as the peripheral docks.

If no peripheral dock is found around the watercraft 10 ("No" in step S13), then the digital controller 25 does not engage the auto-docking control and ends an operation of the watercraft 10 in the auto-docking mode. Then, the watercraft control system 12 will return to the standby mode (step S11). Here, the operation in step S11 is basically identical to the operation in step S11 in FIG. 7, and thus the detailed explanation will be omitted for the sake of brevity.

On the other hand, if at least one peripheral dock is found around the watercraft 10 ("Yes" in step S13), then the digital controller 25 further searches selectable docks DS from among the peripheral docks that have been found (step S141). Specifically, the digital controller 25 further determines whether each of the peripheral docks that have been determined is selectable as a selectable dock DS. In the illustrated embodiment, the digital controller 25 further determines if each of the peripheral docks that have been determined has sufficient area to accommodate the watercraft 10. In particular, the digital controller 25 determines the area or dimension (size) of each of the peripheral docks (i.e., the water surface areas WSA) based on the detection results of the detector 14, and then compares the area of each of the peripheral docks with a predetermined size, such as the dimension (size) of the watercraft 10. Then, for each of the peripheral docks, the digital controller 25 determines that the peripheral dock is selectable as a selectable dock DS in response to determining that the area or dimension (size) of the peripheral dock is larger than the predetermined size, while the digital controller 25 determines that the peripheral dock is not selectable as a selectable dock DS (i.e., a non-selectable dock) in response to determining that the area or dimension (size) of the peripheral dock is not larger than the predetermined size. Therefore, in the illustrated embodiment, the digital controller 25 determines at least one selectable dock DS based on detection result of the detector 14. In particular, the digital controller 25 determines whether the at least one peripheral dock is selectable as a selectable dock DS based on the size of the at least one peripheral dock (i.e., at least one water surface area WSA). Furthermore, in the illustrated embodiment, the digital controller 25 compares the size of the at least one peripheral dock (i.e., the at least one water surface area WSA) with the predetermined size, and the digital controller 25 is further configured to determine whether the at least one peripheral dock is selectable as a selectable dock DS based on comparison result of the size of the at least one peripheral dock (i.e., at least one water surface area WSA) with the predetermined size. Also, in the illustrated embodiment, the predetermined size can be set according to size of the watercraft 10. For example, the predetermined size can be the size of the watercraft 10 or be a size obtained by adding a predetermined room to the size of the watercraft 10.

If no selectable dock DS is found ("No" in step S142), then the digital controller 25 does not engage the auto-docking control and ends an operation of the watercraft 10 in the auto-docking mode. Then, the watercraft control system 12 will return to the standby mode (step S11).

Figure 32:
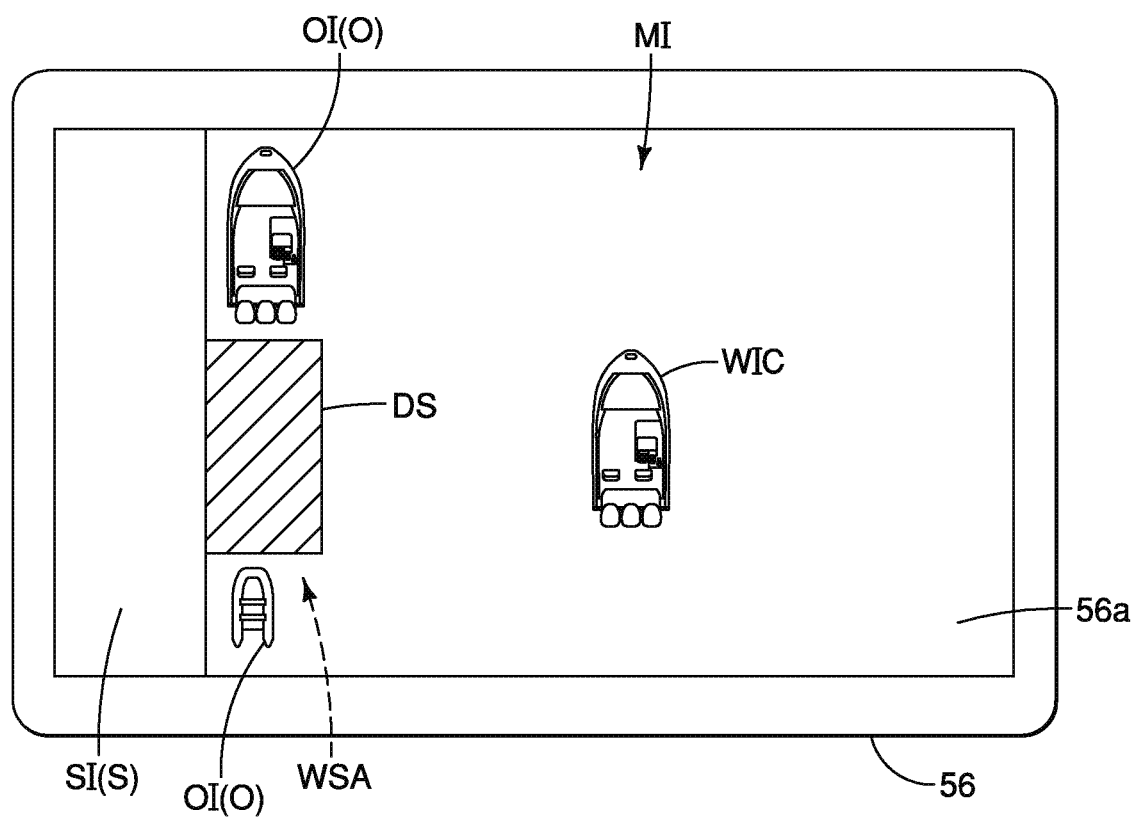
FIG. 32 is a screen shot of a map image displayed on the touch screen display, illustrating a selectable dock being displayed over the map image for selecting a target dock using a graphical user interface.

On the other hand, if at least one selectable dock DS is found from among the peripheral docks ("Yes" in step S142), then the digital controller 25, then the digital controller 25 graphically displays the at least one selectable dock DS on the map image MI as separate from other locations (step S143). In particular, the digital controller 25 graphically displays the map image MI with the at least one selectable dock DS on the touch screen display 56 for selection of the target dock DT. In the illustrated embodiment, in FIG. 32, an example is shown in which one selectable dock DS is found next to a mooring structure S between stationary or anchored objects O (i.e., other watercrafts) in step S141. In this case, as seen in FIG. 32, the digital controller 25 graphically displays the map image MI with a mooring structure image SI indicative of the mooring structure S and object images OI indicative of the stationary or anchored objects O, together with a current watercraft image WIC indicative of the watercraft 10. Furthermore, the digital controller 25 displays a symbol or mark that represents the selectable dock DS at a location corresponding to a water surface area WSA next to the mooring structure S between the stationary or anchored objects O. In the illustrated embodiment, the symbol or mark that represents the selectable dock DS is a rectangle with a predetermined color, such as blue (shown by hatching in FIG. 32), that corresponds to the water surface area WSA. Of course, the digital controller 25 can display the selectable dock DS in a different manner, as needed and/or desired. Furthermore, when two or more selectable docks DS are found in step S141, then the digital controller 25 can also display rectangles that represent the selectable docks DS on the map image MI. With this configuration, the digital controller 25 can graphically display the selectable dock DS on the map image MI to indicate that there is a sufficient area for docking the watercraft 10 in the spacing or area (i.e., the vacant portion) of water between other watercrafts O along the mooring structure S.

After the digital controller 25 display the at least one selectable dock DS on the touch screen display 56 (step S143), the digital controller 25 determines whether a user selection of a target dock DT for docking the watercraft 10 is received (step S15). Specifically, the digital controller 25 determines whether there is a user input selecting a selectable dock DS displayed on the map image MI. If the digital controller 25 receives a user selection of a selectable dock DS, then the digital controller 25 determines that a user selection of a target dock DT is received and select the selectable dock DS as the target dock DT ("Yes" in step S15). Then, the process proceeds to step S16. Here, the operations in steps S16 to S19 are basically identical to the operations in steps S16 to S19 in FIG. 7, and thus the detailed explanation will be omitted for the sake of brevity. Thus, in the illustrated embodiment, the digital controller 25 can select a target dock DT for docking the watercraft 10 in the auto-docking mode in response to the user input selecting a selectable dock DS on the map image MI on the touch screen display 56.

On the other hand, if the digital controller 25 does not receive the user selection of a selectable dock DS for a predetermined time period after displaying the selectable dock DS on the touch screen display 56 (i.e., a timeout) or if the digital controller 25 receives a user input for cancelation from the touch screen display 56 ("No" in step S15), then the digital controller 25 does not engage the auto-docking control and ends an operation of the watercraft 10 in the auto-docking mode. In particular, the watercraft control system 12 will return to the standby mode (step S11).

In the illustrated embodiment, the detector 14 periodically detects peripheral environment of the watercraft 10. Thus, the digital controller 25 can also iteratively determine whether each of the peripheral docks is selectable as a selectable dock DS based on periodical detection result of the detector 14. Thus, the digital controller 25 can iteratively update the map image MI and display the map image MI with the at least one selectable dock DS in step S143 while the detector 14 periodically detects peripheral environment of the watercraft 10.

In the illustrated embodiment, the digital controller 25 displays the at least one selectable dock DS on the touch screen display 56 for a user selection of the target dock DT. Thus, in the illustrated embodiment, the digital controller 25 can determine or verify that the target dock DT that has been selected has sufficient area to accommodate the watercraft 10 and display the determination or verification result by showing the at least one selectable dock DS on the touch screen display 56 prior to the user selection of the target dock DT.

Figure 34:
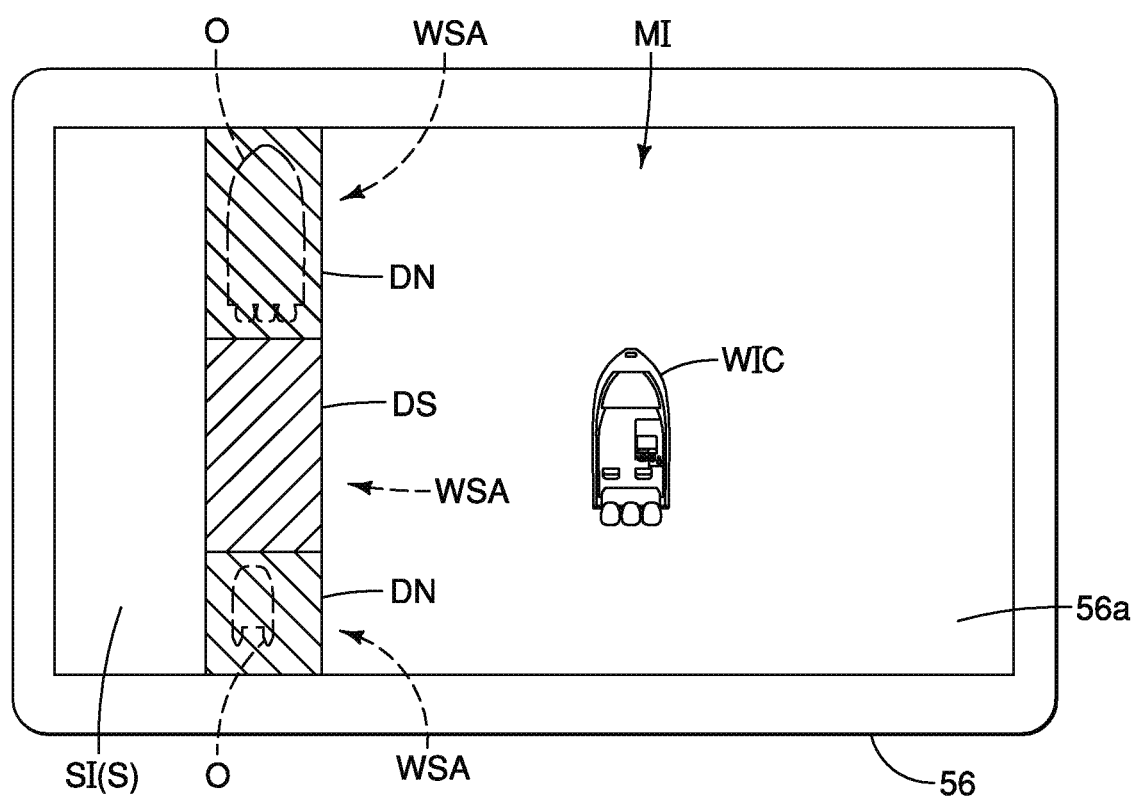
FIG. 34 is a screen shot of a map image displayed on the touch screen display, illustrating a selectable dock and a non-selectable dock being displayed over the map image for selecting a target dock using a graphical user interface.

Additionally, as seen in FIG. 34, the digital controller 25 can also graphically display at least one non-selectable dock DN on the map image MI, which is non-selectable as a target dock DT, in a manner different from the at least one selectable dock DS. In particular, the digital controller 25 can further recognizes water surface areas WSA where stationary or anchored objects O are detected therein by the detector 14 as the non-selectable docks DN, respectively, in step S141 in FIG. 33. Then, the digital controller 25 graphically displays the map image MI with the non-selectable docks DN in step S143 in FIG. 33. In the illustrated embodiment, as seen in FIG. 34, the digital controller 25 graphically displays symbols or marks that represent the non-selectable docks DN at locations corresponding to the water surface areas WSA where the stationary or anchored objects O other watercrafts) arc docked. In the illustrated embodiment, the symbols or marks that represent the non-selectable docks DN are a rectangle with a predetermined color, such as red (shown by different hatching from that of the selectable dock DS in FIG. 34). Of course, the digital controller 25 can display the non-selectable dock DS in a different manner, as needed and/or desired. Thus, in the illustrated embodiment, the non-selectable docks DN can be displayed in a manner distinguished from the selectable dock DS.

In this case, the digital controller 25 graphically displays the map image MI with both the selectable dock DS and the non-selectable docks DN in step S143 in FIG. 33. If no selectable dock DS is found in step S142, then the process does not need to return to the standby mode and can proceed to step S143 to display the non-selectable docks DS on the map image MI without displaying a selectable dock DS.

Furthermore, in this case, in response to a user input selecting one of the non-selectable docks DN on the map image MI using the touch screen display 56, the digital controller 25 can invalidate the user input. For example, the digital controller 25 can be configured not to allow the user to select the non-selectable docks DN on the map image MI, or be configured to deny the selection of the non-selectable docks DN by outputting notification for the user to re-select a selectable dock DS.

In the illustrated embodiment, examples are shown in which the digital controller 25 determines at least one peripheral dock that is located around the watercraft 10 based on the detection results of the detector 14, as shown in FIGS. 32 to 34. However, the digital controller 25 can determine at least one peripheral dock that is located around the watercraft 10 based on prestored-information about the at least one peripheral dock. In particular, at the time of the auto-docking mode being activated, the digital controller 25 receives the current location LC of the watercraft 10 and the current heading HC of the watercraft 10 based on detection results of the detector 14. Furthermore, the digital controller 25 reads out a dock list 70 (see FIG. 8) that has been pre-stored in the memory 25b in advance, and searches the at least one peripheral dock that is located around the watercraft 10 in the dock list 70 (step S12 in FIG. 33). Thus, in this case, the memory 25b (e.g., the computer memory) is provided that is configured to pre-store information about the at least one peripheral dock.

Furthermore, in this case, the digital controller 25 can further determine whether each of the at least one peripheral dock that has been determined is selectable as a selectable dock DS. Specifically, the digital controller 25 determines that a peripheral dock is selectable as a selectable dock DS when the digital controller 25 determines that there is no stationary or anchored object O (i.e., other watercraft) in the peripheral dock based on the detection results of the detector 14. On the other hand, the digital controller 25 determines that a peripheral dock is not selectable as a selectable dock DS (i.e., a non-selectable dock DN) when the digital controller 25 determines that there is a stationary or anchored object O (i.e., other watercraft) in the peripheral dock based on the detection results of the detector 14.

In the illustrated embodiment, as mentioned above, the detector 14 includes one or more active sensors such as lasers, lidar, or millimeter-wave radars, and can also include an image recognition device and/or optical sensors such as one or more cameras. Furthermore, as seen in FIGS. 1 to 3, an example is shown in which the detector 14 is arranged at the bow of the watercraft 10. However, the arrangement of the detector 14 is not limited to this.

Figure 35:
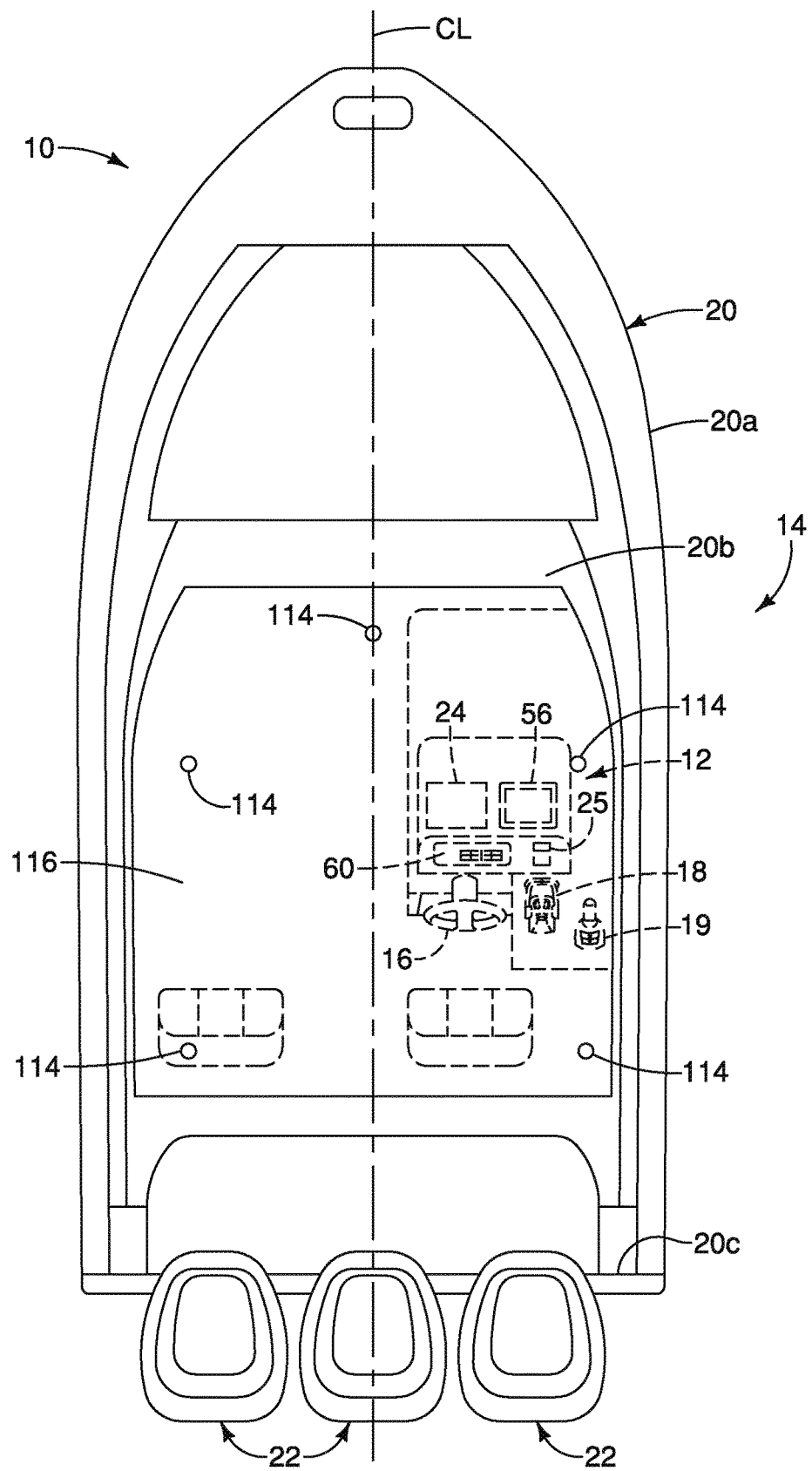
FIG. 35 is a simplified top view of the watercraft including the watercraft control system in accordance with the present disclosure, illustrating a plurality of detectors being mounted on a roof of the watercraft.

As seen in FIG. 35, when the detector 14 includes a plurality of detectors 114 configured to detect peripheral environment of the watercraft 10, the detectors 114 can be arranged to detect the peripheral environment of the watercraft 10 in different directions of the watercraft 10, respectively. In particular, in the illustrated embodiment, the detectors 114 can be mounted on a roof 116 of the watercraft 10 that covers the cockpit of the watercraft 10. Of course, the detectors 114 can be arranged different locations, as desired and/or needed. Furthermore, the detectors 114 can be different types of detectors or sensors, respectively. In particular, the detectors 114 can include a lidar sensor, a radar sensor and an image sensor, respectively. In the illustrated embodiment, as seen in FIG. 35, the detector 14 includes five detectors 114. However, the number of the detectors 114 can be less than or more than five, as needed and/or desired.

Figure 36:
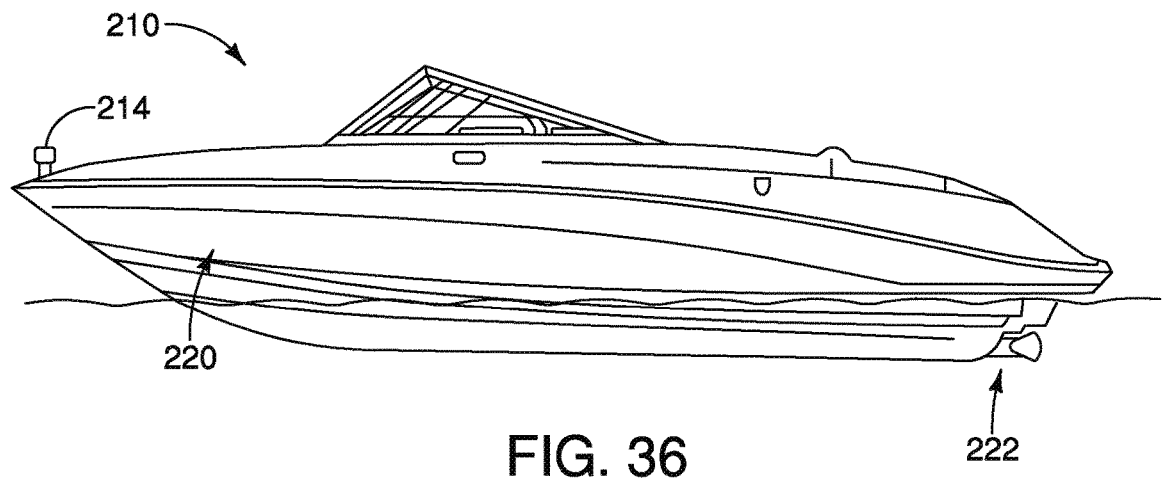
FIG. 36 is a side elevational view of a watercraft equipped with the watercraft control system in which the watercraft is a jet boat that uses jet propulsion.
Figure 37:
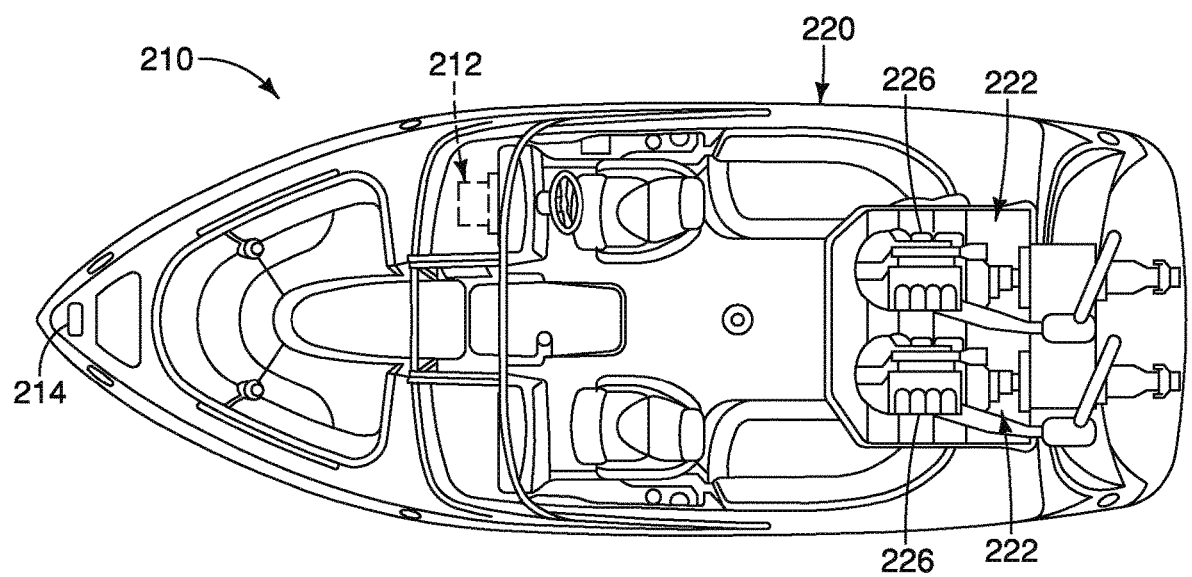
FIG. 37 is a top view of the watercraft illustrated in FIG. 36 with a portion of the watercraft broken away to reveal a pair of jet propulsion units.
Figure 38:
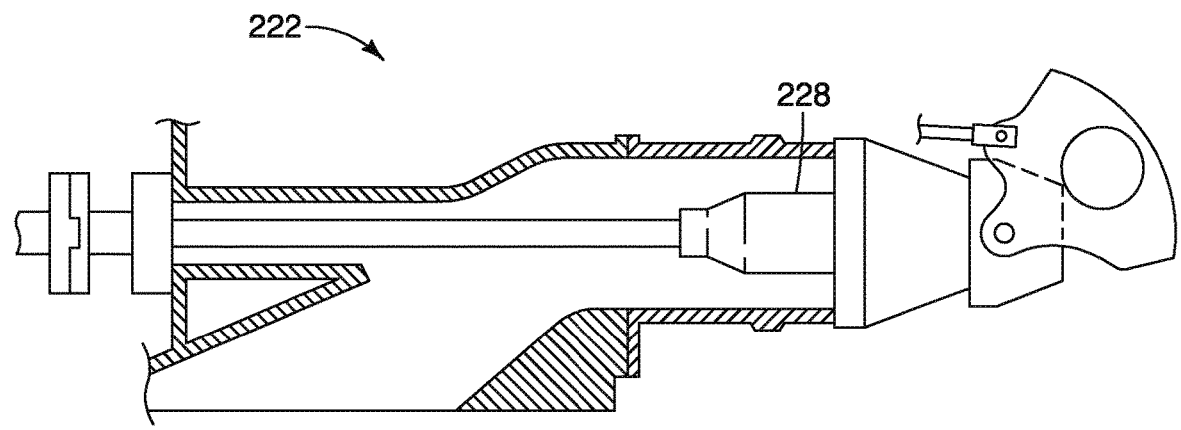
FIG. 38 is a simplified cross-sectional view of one of the jet propulsion units of the watercraft illustrated in FIGS. 36 and 37.

Referring now to FIGS. 36 to 38, a watercraft 210 is illustrated in the form of a jet propulsion boat that is equipped with a watercraft control system 212. The watercraft control system 212 is the same as the watercraft control system 12, discussed above, except that the watercraft control system 212 is adapted to a jet propulsion boat. Basically, the watercraft 210 includes a watercraft body 220 and a pair of propulsion units 222. The watercraft body 220 is provided with the propulsion units 222 in a conventional manner. The propulsion units 222 are steerable in a conventional manner. Each of the propulsion units 222 includes an engine 226 as seen in FIG. 37. Each of the engines 226 drives an impeller 228 as seen in FIG. 38 in a conventional manner. Since jet propulsion boats are well known, the watercraft 210 will not be discussed in more detail.

The watercraft control system 212 is configured to execute the auto-docking mode in the same way as the watercraft control system 12. Thus, the watercraft 210 is provided with a detector 214 for auto-docking the watercraft 210. Like, the first embodiment, the detector 214 includes one or more active sensors, the image recognition device and/or the optical sensors that are used to detect the peripheral environment of the watercraft 10 in real-time. In this way, the watercraft control system 212 can execute the auto-docking mode in the same way as the watercraft control system 12 such that the watercraft 210 can be autonomously navigated to the target dock DT along the docking path PD.

Figure 39:
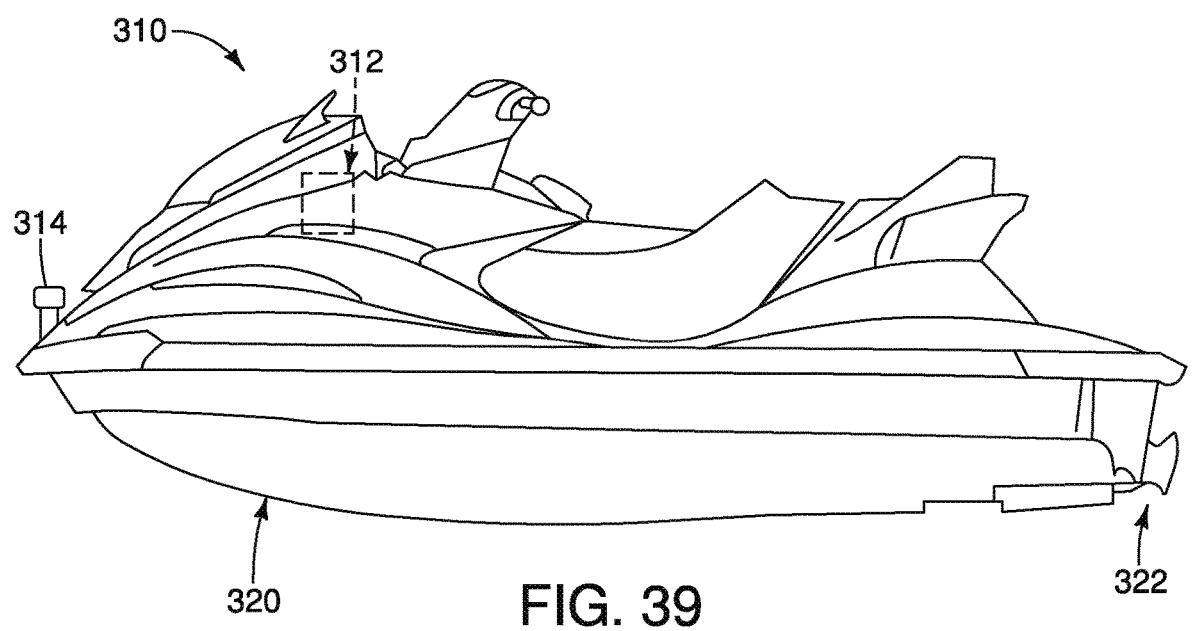
FIG. 39 is a side elevational view of a watercraft equipped with the watercraft control system in which the watercraft is a personal watercraft that uses jet propulsion.

Referring now to FIG. 39, a watercraft 310 is illustrated in the form of a personal watercraft that is equipped with a watercraft control system 312. The watercraft 310 is a saddle seat type of personal watercraft that is well known. The watercraft control system 312 is the same as the watercraft, control system 12, discussed above, except that the watercraft control system 312 is adapted to a personal watercraft. Basically, the watercraft 310 includes a watercraft body 320 and a single propulsion unit 322. The watercraft body 320 is provided with the propulsion unit 322 in a conventional manner. The propulsion unit 322 is a jet propulsion device similar to the one illustrated in FIG. 38. The watercraft control system 312 of the watercraft 310 is configured to carry out the auto-docking mode in the same manner as discussed above. Since personal watercrafts are well known, the watercraft 310 will not be discussed in more detail.

The watercraft control system 312 is configured to execute the auto-docking mode in the same way as the watercraft control system 12. Thus, the watercraft 310 is provided with a detector 314 for auto-docking the watercraft 310. Like, the first embodiment, the detector 314 includes one or more active sensors, the image recognition device and/or the optical sensors that are used to detect the peripheral environment of the watercraft 10 in real-time. In this way, the watercraft control system 312 can execute the auto-docking mode in substantially the same way as the watercraft control system 12 such that the watercraft 310 can be autonomously navigated to the target dock DT along the docking path PD.

In accordance with a first aspect of this disclosure, a watercraft auto-docking system comprising: a user interface including a display monitor; and a digital controller including a processor, a computer memory and an I/O interface, the user interface being connected to the I/O interface, the digital controller being configured to select a target dock based on a user selection from at least one candidate dock displayed on the display monitor using the user interface for docking a watercraft in an auto-docking mode, the digital controller being configured to generate a docking path from a current location of the watercraft to a target location of the target dock, the digital controller being configured to autonomously navigate the watercraft using an autopilot system along the docking path until the watercraft reaches the target location of the target dock.

In accordance with a second aspect of this disclosure, with the watercraft auto-docking system according to the first aspect, the digital controller is further configured to determine at least one peripheral dock that is located within a predetermined distance from the current location of the watercraft, and the digital controller is further configured to display the at least one peripheral dock as the at least one candidate dock on the display monitor.

In accordance with a third aspect of this disclosure, with the watercraft auto-docking system according to the first aspect, the digital controller is further configured to graphically display a map image on the display monitor, and the digital controller is further configured to receive the user selection of the target dock in response to a user input selecting a location of the map image displayed on the display monitor using the user interface.

In accordance with a second aspect of this disclosure, with the watercraft auto-docking system according to the third aspect, the digital controller is further configured to graphically display a first image and a second image on the map image on the display monitor, the first image being indicative of the watercraft located at the current location of the watercraft, the second image being indicative of the watercraft, and the digital controller is configured to receive the user selection of the target dock based on movement of the second image to the target location of the target dock on the map image in response to a user input using the user interface.

In accordance with a fifth aspect of this disclosure, with the watercraft auto-docking system according to the fourth aspect, the digital controller is configured to limit movement of the second image on the map image within an area according to the predetermined distance in response to a user input using the user interface.

In accordance with a sixth aspect of this disclosure, with the watercraft auto-docking system according to the fourth aspect, the digital controller is further configured. to display the second image on the display monitor in response to a user input selecting the first image on the map image using the user interface.

In accordance with a seventh aspect of this disclosure, with the watercraft auto-docking system according to the fourth aspect, the digital controller is further configured to receive a target orientation of the watercraft at the target location of the target dock by changing an orientation of the second image at the location of the target dock on the map image using the user interface.

In accordance with an eighth aspect of this disclosure, with the watercraft auto-docking system according to the fourth aspect, the digital controller is further configured to receive the user selection of the target dock in response to a user input confirming the user selection of the target dock displayed on the display monitor using the user interface.

In accordance with a nineth aspect of this disclosure, with the watercraft auto-docking system according to the second aspect, the digital controller is further configured to display information of the at least one peripheral dock in a list on the display monitor.

In accordance with a tenth aspect of this disclosure, with the watercraft auto-docking system according to the nineth aspect, the digital controller is configured to receive the user selection of the target dock in response to a user input selecting the target dock from the list using the user interface.

In accordance with an eleventh aspect of this disclosure, with the watercraft auto-docking system according to the nineth aspect, the computer memory is configured to store coordinate information and orientation information of the at least one peripheral dock in advance.

In accordance with a twelfth aspect of this disclosure, with the watercraft auto-docking system according to the second aspect, the digital controller is further configured to end an operation of the watercraft in the auto-docking mode upon determining that no peripheral dock is located within the predetermined distance from the current location of the watercraft.

In accordance with a thirteenth aspect of this disclosure, with the watercraft auto-docking system according to the first aspect, the digital controller is further configured to generate the docking path including a waypoint between the current location of the watercraft and the target location of the target dock.

In accordance with a fourteenth aspect of this disclosure, with the watercraft auto-docking system according to the thirteenth aspect, the digital controller is further configured to navigate the watercraft such that the watercraft turns at the waypoint to align with a target orientation of the watercraft at the target location of the target dock.

In accordance with a fifteenth aspect of this disclosure, with the watercraft auto-docking system according to the thirteenth aspect, the digital controller is further configured to generate the docking path such that the waypoint is located at a predetermined distance from the target location of the target dock, with the predetermined distance being settable using the user interface.

In accordance with a sixteenth aspect of this disclosure, with the watercraft auto-docking system according to the first aspect, wherein the digital controller is further configured to graphically display the docking path on a map image on the display monitor.

In accordance with a seventeenth aspect of this disclosure, with the watercraft auto-docking system according to the first aspect, the user interface further includes a physical button operatively connected to the digital controller to activate the auto-docking mode In accordance with an eighteenth aspect of this disclosure, with the watercraft auto-docking system according to the first aspect, the digital controller is further configured to end an operation of the watercraft in the auto-docking mode in response to the watercraft reaching the target location of the target dock.

In accordance with a nineteenth aspect of this disclosure, with the watercraft auto-docking system according to the first aspect, the digital controller is further configured to switch an operation of the watercraft from the auto-docking mode to a user-specified mode that is specified by a user in response to the watercraft reaching the location of the target dock.

In accordance with a twentieth aspect of this disclosure, with the watercraft auto-docking system according to the nineteenth aspect, the user-specified mode includes a joystick mode in which the watercraft is navigated according to a user's manual input using a joystick.

In accordance with a twenty-first aspect of this disclosure, with the watercraft auto-docking system according to the nineteenth aspect, the user-specified mode includes a stay point mode in which the watercraft is automatically navigated to remain stationary.

In accordance with a twenty-second aspect of this disclosure, a watercraft auto-docking method comprising: displaying at least one candidate dock on a display monitor; selecting a target dock from the at least one candidate dock displayed on the display monitor using a user interface for docking a watercraft in an auto-docking mode; generating, a docking path from a current location of the watercraft to a target location of the target dock using a digital controller; and autonomously navigating the watercraft using an auto-pilot system along the docking path until the watercraft reaches the target location of the target dock.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Thus, as used herein, the singular forms "a," "an" and "the" are intended to include the plural forms as well, unless the context clearly indicates otherwise. Also, the terms "part," "section," "portion," "member" or "element" when used in the singular can have the dual meaning of a single part or a plurality of parts. Unless otherwise defined, all terms (including technical and scientific terms) used herein have the same meaning as commonly understood by one of ordinary skill in the art to which illustrative embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Additionally, similar words used to describe the relationship between elements or layers should be interpreted in a like fashion (e.g., "between" versus "directly between", "above" versus "directly above", "below" versus "directly below", "adjacent" versus "directly adjacent," "on" versus "directly on"). Thus, components that are shown directly connected or contacting each other can have intermediate structures disposed between them unless specified otherwise.

It will be understood that, although the terms "first", "second", etc. may be used herein to describe various elements, components, regions, layers, positions and/or sections, these elements, components, regions, layers, positions and/or sections should not be limited by these terms. These terms are only used to distinguish one element, component, region, layer, position or section from another element, component, region, layer, position or section. Thus, a first element, component, region, layer, position or section discussed above could be termed a second element, component, region, layer, position or section without departing from the teachings of illustrative embodiments.

Spatially relative terms, such as "forward", "rearward", "above", "below", "beneath", "downward", "vertical", "horizontal", and "transverse" as well as any other similar spatial terms may be used herein for the ease of description to describe one element or feature's relationship to another element(s) feature(s) of the above embodiments. These terms, as utilized to describe the present invention should be interpreted relative to a watercraft floating in calm water.

The terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A watercraft auto-docking system comprising:
a user interface including a display monitor; and a digital controller including a processor, a computer memory and an I/O interface, the user interface being connected to the I/O interface, the digital controller being configured to determine at least one water surface area that is adjacent to a mooring structure and where no object is detected therein, as at least one peripheral dock that is located around a watercraft, respectively, the digital controller being configured to determine whether the at least one peripheral dock is selectable as at least one selectable dock based on size of the at least one water surface area, the digital controller being configured to determine at least one water surface area where a stationary or anchored object is detected therein, as at least one non-selectable dock, respectively, the digital controller being configured to graphically display a map image with the at least one selectable dock on the display monitor in response to determining that the at least one peripheral dock is selectable as the at least one selectable dock based on the size of the at least one water surface area, the at least one selectable dock being represented on the map image as an enclosed area that is adjacent to the image indicative of the mooring structure the digital controller being configured to graphically display the at least one non-selectable dock on the map image in a manner different from the at least one selectable dock, the at least one non-selectable dock being represented on the map image as an enclosed area that is distinct from the enclosed area of the at least one selectable dock and is dimensioned according to size of the stationary or anchored object therein, the digital controller being further configured to select a target dock for docking the watercraft in an auto-docking mode in response to a user input selecting a selectable dock on the map image using the user interface, the digital controller being configured to generate a docking path from a current location of the watercraft to a target location of the target dock, the digital controller being configured to autonomously navigate the watercraft using an autopilot system along the docking path until the watercraft reaches the target location of the target dock.

2. The watercraft auto-docking system according to claim 1, further comprising at least one detector configured to detect peripheral environment of the watercraft, the digital controller being further configured to determine the at least one selectable dock based on detection result of the at least one detector.

3. The watercraft auto-docking system according to claim 1, further comprising a computer memory configured to pre-store information about the at least one peripheral dock.

4. The watercraft auto-docking system according to claim 1, further comprising at least one detector configured to detect peripheral environment of the watercraft, the digital controller being further configured to determine the at least one peripheral dock based on detection result of the at least one detector.

5. The watercraft auto-docking system according to claim 1, wherein the digital controller is further configured to compare the size of the at least one water surface area with a predetermined size, and the digital controller is further configured to determine whether the at least one peripheral dock is selectable as the at least one selectable dock based on comparison result of the size of the at least one water surface area with the predetermined size.

6. The watercraft auto-docking system according to claim 5, wherein the predetermined size is set according to size of the watercraft.

7. The watercraft auto-docking system according to claim 1, further comprising at least one detector configured to periodically detect peripheral environment of the watercraft, the digital controller being further configured to iteratively determine whether the at least one peripheral dock is selectable as the at least one selectable dock based on periodical detection result of the at least one detector.

8. The watercraft auto-docking system according to claim 1, wherein in response to a user input selecting the non-selectable dock on the map image using the user interface, the digital controller is further configured to invalidate the user input.

9. The watercraft auto-docking system according to claim 1, further comprising a plurality of detectors configured to detect peripheral environment of the watercraft.

10. The watercraft auto-docking system according to claim 9, wherein the detectors are arranged to detect the peripheral environment of the watercraft in different directions of the watercraft, respectively.

11. The watercraft auto-docking system according to claim 9, wherein the detectors are different types of detectors, respectively.

12. The watercraft auto-docking system according to claim 9, wherein the detectors include at least one of a lidar sensor, a radar sensor and an image sensor.

13. The watercraft auto-docking system according to claim 9, wherein at least one of the detectors is mounted on a roof of the watercraft.

14. A watercraft auto-docking method comprising:

determining at least one water surface area that is adjacent to a mooring structure and where no object is detected therein, as at least one peripheral dock that is located around a watercraft, respectively;

determining whether the at least one peripheral dock is selectable as at least one selectable dock based on size of the at least one water surface area;

determining at least one water surface area where a stationary or anchored object is detected therein, as at least one non-selectable dock, respectively;

graphically displaying a map image with the at least one selectable dock on a display monitor in response to determining that the at least one peripheral dock is selectable as the at least one selectable dock based on the size of the at least one water surface area, the at least one selectable dock being represented on the map image as an enclosed area that is adjacent to the image indicative of the mooring structure;

graphically display the at least one non-selectable dock on the map image in a manner different from the at least one selectable dock, the at least one non-selectable dock being represented on the map image as an enclosed area that is distinct from the enclosed area of the at least one selectable dock and is dimensioned according to size of the stationary or anchored object therein:

selecting a target dock for docking the watercraft in an auto-docking mode in response to a user input selecting a selectable dock on the map image using a user interface;

generating a docking path from a current location of the watercraft to a target location of the target dock using a digital controller; and autonomously navigating the watercraft using an autopilot system along the docking path until the watercraft reaches the target location of the target dock.

* * * * *